(12) United States Patent
Yoneda et al.

(10) Patent No.: US 10,563,804 B2
(45) Date of Patent: Feb. 18, 2020

(54) SNAP TAP MOUNTING JIG

(71) Applicant: Yone Corporation, Kyoto-shi, Kyoto (JP)

(72) Inventors: Toyohiko Yoneda, Kyoto (JP); Tetsuzo Yoneda, Kyoto (JP); Norio Doman, Kyoto (JP)

(73) Assignee: YONE CORPORATION, Kyoto (JP)

( * ) Notice: Subject to any disclaimer, the term of this patent is extended or adjusted under 35 U.S.C. 154(b) by 42 days.

(21) Appl. No.: 15/562,042

(22) PCT Filed: Nov. 29, 2016

(86) PCT No.: PCT/JP2016/085338
§ 371 (c)(1),
(2) Date: Sep. 27, 2017

(87) PCT Pub. No.: WO2017/168832
PCT Pub. Date: Oct. 5, 2017

(65) Prior Publication Data
US 2018/0195655 A1    Jul. 12, 2018

(30) Foreign Application Priority Data

Mar. 29, 2016  (JP) .................................. 2016-066493

(51) Int. Cl.
*F16L 41/06*   (2006.01)
*F16L 41/08*   (2006.01)
(Continued)

(52) U.S. Cl.
CPC .............. *F16L 41/06* (2013.01); *F16L 41/082* (2013.01); *F16L 41/088* (2013.01); *E03B 7/02* (2013.01); *E03B 9/12* (2013.01)

(58) Field of Classification Search
CPC ....... F16L 41/06; F16L 41/082; F16L 41/088; E03B 7/02
(Continued)

(56) References Cited

U.S. PATENT DOCUMENTS 3,131,953 A    5/1964  Windsor
3,754,731 A    8/1973  Mackal et al.
(Continued)

FOREIGN PATENT DOCUMENTS

GB    2 389 245      12/2003
JP    6-257192        9/1994
(Continued)

OTHER PUBLICATIONS

PCT/JP2016/085338, International Search Report and Written Opinion, dated Mar. 21, 2017, 10 pages—Japanese, 3 pages—English.
(Continued)

*Primary Examiner* — Kevin L Lee
(74) *Attorney, Agent, or Firm* — Andrew F. Young, Esq.; Lackenbach Siegel, LLP

(57) ABSTRACT

Provided is a snap tap mounting jig for mounting a snap tap where the generation of buckling can be prevented by reducing a diameter enlarging pressing force of a diameter enlarging roller, a shim can be mounted on both end surfaces of the diameter enlarging roller, and a fold-back deformation amount of a metal sleeve can be checked from the outside. The snap tag mounting jig is also characterized as follows. The diameter enlarging roller is formed into a hyperboloid shape, and the recessed portion is formed such that a substantially upper half portion of the diameter enlarging roller mounted obliquely is formed into a substantially tapered shape, and a substantially lower half portion of the diameter enlarging roller mounted obliquely is formed into a rounded shape. An inclination angle of the diameter enlarging roller mounted obliquely falls within a range of from 65 degrees to 77 degrees, and a recessed groove portion is formed on an upper end surface and a lower end surface of the diameter enlarging roller, and a shim is fitted into the recessed groove portion.

9 Claims, 24 Drawing Sheets

(51) Int. Cl.
   *E03B 9/12* (2006.01)
   *E03B 7/02* (2006.01)
(58) Field of Classification Search
   USPC .......................................................... 137/318
   See application file for complete search history.

(56) References Cited

U.S. PATENT DOCUMENTS

| | | | |
|---|---|---|---|
| 3,942,240 A | | 3/1976 | Gebelius |
| 4,527,586 A | * | 7/1985 | Yano et al. ........... F16K 27/006 |
| | | | 137/318 |
| 9,004,090 B2 | * | 4/2015 | Asai ........................ E03B 7/006 |
| | | | 137/15.09 |
| 2016/0281897 A1 | | 9/2016 | Yoneda et al. |

FOREIGN PATENT DOCUMENTS

| | | |
|---|---|---|
| JP | 8-232304 | 9/1996 |
| JP | 9-273186 | 10/1997 |
| JP | 11-190457 | 7/1999 |
| WO | WO 2014/148645 | 9/2014 |

OTHER PUBLICATIONS

EP 16897048.1—Extended European Search Report dated Dec. 14, 2018, 9 pages—English.

\* cited by examiner

SNAP TAP MOUNTING JIG

CROSS REFERENCE TO RELATED APPLICATIONS

This application claims priority from and is a § 371 National Phase of Ser. No. PCT/JP2016/085338 filed Nov. 29, 2016, the entire contents of which are herein incorporated by reference, which in turn claims priority from JP Ser. No. JP 2016-066493 filed Mar. 29, 2016.

TECHNICAL FIELD

The present invention relates to a technique concerning a snap tap mounting jig for mounting a snap tap in a water diverting port formed by drilling a peripheral wall of a water pipe.

BACKGROUND ART

Conventionally, to supply water to buildings such as factories, offices and respective households, water pipes through which water taken in from rivers or the like flows are buried underground.

When a building is newly built, there may be a case where, to supply water to a water area in the building, a construction work is performed so as to mount a snap tap for diverting water from an existing water pipe on the water pipe.

In such a case, a water diverting port is formed by drilling a peripheral wall of the water pipe with a drilling machine equipped with a drill, and a metal sleeve or a snap tap integrally formed with such a metal sleeve is mounted on a periphery of the water diverting port together with a rubber packing so that water can be taken out from the water pipe in a diverting manner while preventing leakage of water from the water diverting port.

Particularly, recently, in locking and fixing a metal sleeve or a sleeve portion which is integrally formed with fc also simply referred to as "metal sleeve") to a water diverting port, there has been proposed a method where an opening portion formed at one end of the metal sleeve is made to project from the inside of the water diverting port of the water pipe, and a distal end portion of the opening of the metal sleeve which projects into the inside of the water pipe is bent by a diameter enlarging head mounted on a distal end of a main shaft of a jig inserted into the inside of the metal sleeve, a diameter enlarging roller mounted on the diameter enlarging head obliquely and the like such that the distal end portion of the opening of the metal sleeve is folded back on an outer periphery of the metal sleeve, and the distal end portion of the opening of the metal sleeve is caulked to the water diverting port of the water pipe.

In this manner, to enable mounting of the snap tap while ensuring watertight connection between the water pipe and the mounting portion of the snap tap, there has been known the use of the snap tap mounting jig which is, as described above, constituted of the diameter enlarging head mounted on the distal end of the main shaft and the diameter enlarging roller mounted on the diameter enlarging head or the like obliquely.

As described in detail in patent literature 1, for example, with respect to the manner of operating the jig, the diameter enlarging roller having a Japanese-hand-drum shape and mounted on the diameter enlarging head formed on the distal end of the main shaft obliquely is brought into contact with the peripheral edge portion of the opening of the metal sleeve while manually adjusting the elevation or lowering of the main shaft and, subsequently, the peripheral edge portion of the opening of the metal sleeve is bent by the diameter enlarging roller arranged on the distal end of the main shaft such that the peripheral edge portion is folded back to the outside by rotating the main shaft and, thereafter, the peripheral portion of the opening of the metal sleeve is engaged by caulking to the peripheral edge of the water diverting port formed by drilling in the peripheral wall of the water pipe thus making the snap tap engaged and fixed to the water diverting port and performing sealing of the water diverting port with certainty.

In this case, the structure is adopted where the metal part is caulked to the water diverting port of the water pipe. Accordingly, when a pipe wall thickness of the water pipe differs or a size of the water diverting port differs, it is necessary to communicably connect the snap tap to the water diverting port with certainty in a state where a complete sealing function is acquired corresponding to a change in such a situation. To this end, it is necessary to bend and caulk a diameter-enlarged end edge portion of the metal sleeve to the water diverting port of the water pipe with certainty.

CITATION LIST

Patent Literature

Patent Literature 1: WIPO 2014/148645 brochure

SUMMARY OF INVENTION

Technical Problem

However, when the peripheral edge portion of the opening of the metal sleeve is bent by the diameter enlarging roller with a strong rotational force of the main shaft, sometimes, because of an upward pushing force generated by the diameter enlarging roller, there may be a case where bellows-like buckling, that is, elephant foot buckling is generated in the metal sleeve.

When such buckling is generated, a bent shape of the sleeve becomes non-uniform so that the peripheral edge portion of the opening of the sleeve is not folded back in a rounded shape with certainty. Accordingly, when an undesired bending stress or tensile stress is generated in a blanched portion of the snap tap due to an earthquake or the like, a rubber packing is abnormally compressed so that a seal function between the water pipe and the blanched portion of the snap tap is lowered.

That is, a folded-back end edge portion of the cylindrical rubber packing interposed between the sleeve which is folded back inside the end edge of the water diverting port of the water pipe and an inner peripheral surface of the water pipe is liable to be easily broken so that there is a possibility that a seal function is lowered.

Further, when the diameter enlarging roller is formed into a Japanese-hand-drum shape for merely bending the peripheral edge portion of the opening of the metal sleeve, the end edge flange of the roller is deformed outward so that an inner surface of a roller accommodating chamber formed on the diameter enlarging head and the end edge flange come into contact with each other whereby the roller is brought into a non-rotatable state.

Further, when the metal sleeve is plastically deformed merely by a tapered portion of the roller, a diameter enlarging force is increased so that a flange portion of the diameter enlarging roller is inclined thus generating wear on a shim. Still further, even when the shim is adhered to an end surface of the roller for imparting a predetermined space function to the shim, the shim cannot be bonded accurately so that the shim cannot exhibit an accurate spacer function.

Further, it is necessary to perform a diverting operation without causing the suspension of water supply and hence, the structure is adopted where an operating portion of the diameter enlarging roller is water-tight and is not viewable from the outside. Accordingly, it is not possible to check a fold-back deformation amount of the metal sleeve at the blanched portion.

The present invention has been made in view of such circumstances, and it is an object of the present invention to provide a snap tap mounting jig for mounting a snap tap where the generation of buckling can be prevented by reducing a diameter enlarging pressing force of a diameter enlarging roller, a shim can be mounted on both end surfaces of the diameter enlarging roller with certainty, and a fold-back deformation amount of a metal sleeve can be checked from the outside.

To overcome the above-mentioned conventional drawbacks, a snap tap mounting jig according to the present invention is configured as follows.

(1) A rubber packing is fitted into a water diverting port formed in a water pipe by drilling while mounting the rubber packing on a distal end of a main shaft, an opening distal end portion of a metal sleeve loosely fitted on an inner peripheral surface of the rubber packing is configured to be insertable and projectable into the inside of the water pipe, an eccentrically movable shaft is inserted into the main shaft in a longitudinal direction, a diameter enlarging roller is mounted on a lower end of the eccentrically movable shaft obliquely by way of a diameter enlarging head, the diameter enlarging roller is configured to advance or retract toward the inside or the outside of an outer diameter of the main shaft due to eccentric rotation of the eccentrically movable shaft, and a snap tap is configured to be caulked to the water diverting port of the water pipe by bending the opening distal end portion of the metal sleeve toward the outside in a folded-back state together with the rubber packing due to the rotation of the main shaft while bringing the diameter enlarging roller into contact with the opening distal end portion of the metal sleeve projecting into the inside of the water pipe in a state where the diameter enlarging roller is advanced to the outside of the outer diameter of the main shaft, wherein the diameter enlarging roller is formed into a Japanese-hand-drum shape or a hour glass shape (hyperbolic shape) having a recessed portion, and the recessed portion is formed such that a substantially upper half portion of the diameter enlarging roller mounted obliquely is formed into a substantially tapered shape, and a substantially lower half portion of the diameter enlarging roller is formed into a rounded shape.

The snap tap mounting jig according to the present invention also has the following technical features.

(2) An inclination angle of the tapered portion of the diameter enlarging roller mounted obliquely falls within a range of an angle of depression from 65 degrees to 77 degrees with respect to an imaginary straight line orthogonal to an axis of the eccentric movable shaft.

(3) The diameter enlarging roller has a start end flange portion with which a distal end of the metal sleeve is brought into contact at the time of starting the enlarging of a diameter of the metal sleeve on an upper end side of the recessed portion, and a friction portion is formed on the start end flange portion.

(4) The friction portion is formed by forming friction structural members which generate a frictional force on a circumference of the start end edge portion at predetermined intervals.

(5) The friction structural members are formed ranging from the start end flange portion to an upper region of the tapered portion, and a groove depth of a crest and valley structure of the friction portion formed of the friction structural members is gradually decreased from the start end flange portion to the tapered portion.

(6) Peaks of crest portions of the crest and valley structure are obtuse peaks.

(7) A recessed groove portion is formed on an upper end surface and a lower end surface of the diameter enlarging roller, and a shim is fitted into the recessed groove portion.

(8) The snap tap mounting jig includes, for detecting an enlarged diameter amount of a distal end of the metal sleeve by the diameter enlarging roller, an enlarged diameter amount detection mechanism on a proximal end operating portion of a roller shaft having a distal end on which the diameter enlarging roller is continuously formed, and the enlarged diameter amount detection mechanism is configured to indicate an elevation and a rotational amount of the roller shaft as the enlarged diameter amount by means of a scale marked on an enlarged diameter amount detection nut.

Advantage of the Invention

According to the present invention, the recessed portion of the diameter enlarging roller is formed such that a substantially upper half portion of the recessed portion is formed into a tapered shape, and a substantially lower half portion of the recessed portion is formed into a rounded shape. With such a configuration, firstly, the metal sleeve is enlarged while being elastically deformed straightly by the tapered portion and, then, the metal sleeve is plastically deformed into a rounded shape by the round portion and hence, the metal sleeve is formed into a tapered shape which traces a semicircular arcuate shape. Accordingly, the snap tap mounting jig can make the metal sleeve engaged with the end edge of the water diverting port with certainty, and allows the rubber packing to perform a sufficient sealing function.

A diameter enlarging force applied to the terminal flange portion is increased as an angle of the diameter enlarging roller shaft is increased, while the diameter enlarging force is decreased as the angle of the diameter enlarging roller shaft is decreased. Accordingly, the angle can be adjusted corresponding to a required diameter enlarging force.

The distal end of the opening of the metal sleeve is elastically deformed by applying a force by the tapered portion immediately before the distal end of the opening of the metal sleeve is plastically deformed, and the distal end of the opening of the metal sleeve is folded back while being plastically deformed by applying final diameter enlargement to the metal sleeve by the rounded portion of the diameter enlarging roller in such a state and hence, a pressure applied to a roller accommodating chamber and an outer periphery of the roller shaft is reduced. Accordingly, the snap tap mounting jig is also applicable to an operation which requires a large diameter enlarging force such as a diverting operation where a water pipe having a large diverting diameter and a large pipe thickness is used.

Since a diameter enlarging force also can be adjusted by adjusting the inclination of the roller shaft, a diameter enlarging force can be decreased by adjusting an inclination angle of the tapered portion of the diameter enlarging roller within a range of an angle of depression from 65 degrees to 77 degrees with respect to an imaginary straight line orthogonal to an axis of the eccentric movable shaft, and a pressure of the roller applied to an inner wall of the roller accommodating chamber can be adjusted by changing an angle of the roller with respect to the shaft. Particularly, a force applied to a terminal end flange portion of the diameter enlarging roller can be increased by increasing the inclination of the roller shaft, while a force applied to the terminal end flange portion of the diameter enlarging roller can be decreased by decreasing the inclination of the roller shaft.

Although a diameter enlarging force generated by the tapered portion of the diameter enlarging roller applies a deformation stress to the lower end portion of the metal sleeve along the roller shaft, the diameter enlarging force does not become a large force which generates plastic deformation such as the rounded portion and hence, the plastic deformation at the rounded portion in the next step can be performed in a rounded shape with certainty and accuracy.

Further, a diameter enlarging stress at the tapered portion pushes the diameter enlarging roller in a start end flange portion direction, and a diameter enlarging stress at the rounded portion pushes the diameter enlarging roller in the terminal end flange portion direction. Accordingly, a value obtained by subtracting an elastic deformation force generated by the tapered portion from a plastic deformation force generated by the rounded portion of the diameter enlarging roller becomes a pressure applied to the inner wall of the roller accommodating chamber and hence, an applied pressure load can be decreased.

In this manner, when a pressure applied to the inner wall of the roller accommodating chamber is decreased, a force applied to an outer periphery of the main shaft is also decreased.

In this manner, by using an elastic deformation force generated by the tapered portion of the diameter enlarging roller at maximum, a bending force applied to the roller shaft and the main shaft can be decreased so that a favorable balance can be acquired between the roller shaft and the main shaft.

Accordingly, a diameter enlarging operation can be performed with a small force and hence, wear of the shim or the like is decreased whereby the deformation of the start end flange portion and the terminal end flange portion of the diameter enlarging portion is also obviated.

Further, the diameter enlarging roller may have the start end flange portion with which the distal end of the metal sleeve is brought into contact at the time of starting the enlarging of a diameter of the metal sleeve on the upper end side of the recessed portion, and the friction portion may be formed on the start end flange portion. With such a configuration, a diameter enlarging force of the diameter enlarging roller can be properly transmitted to the sleeve and hence, slippage can be suppressed. Accordingly, the diameter enlarging roller can be rotate forcibly and hence, the occurrence of sticking or seizure can be prevented. Further, since the seizure can be prevented, the generation of metal powder can be prevented.

Further, a rotational force of the diameter enlarging handle can be efficiently transmitted to the diameter enlarging roller and hence, a force in a pull-up direction applied to the diameter enlarging roller can be decreased and hence, lifetimes of members around the diameter enlarging roller can be prolonged by decreasing wears or the like on these members. Particularly, when the diameter enlarging roller cannot be rotated due to seizure, the diameter enlargement cannot be performed unless a large force is applied to the diameter enlarging handle. However, seizure of the diameter enlarging roller can be eliminated and hence, it is possible to reduce a force applied to the diameter enlarging handle.

Further, a groove mark disappears along with the enlargement of diameter of the sleeve and hence, an inner peripheral surface of the sleeve enlarged in a funnel shape can have a smooth surface state.

The snap tap mounting jig is also applicable to enlarging a diameter of a snap tap.

Further, the shape of the diameter enlarging roller can be made compact and hence, the diameter enlarging head can be made compact.

The friction portion is formed by forming friction structural members which generate a frictional force on the circumference of the start end edge portion at predetermined intervals. With such a configuration, while surely allowing the rotational following of the diameter enlarging roller in a direction toward the sleeve inner peripheral surface, the slide resistance of the sleeve along the recessed portion of the diameter enlarging roller can be suppressed as much as possible and hence, a load to the diameter enlarging roller and a load to the peripheral member of the diameter enlarging roller brought about by the formation of the friction portion can be reduced.

The friction structural members are formed ranging from the start end flange portion to the upper region of the tapered portion, and a groove depth of the crest and valley structure of the friction portion formed of the friction structural members is gradually decreased from the start end flange portion to the tapered portion. With such a configuration, a load applied to the diameter enlarging roller and a load applied to members around the diameter enlarging roller brought about by the formation of the friction portion can be reduced. Further, marks formed on the diameter enlarged portion of the sleeve generated due to contacting of the diameter enlarged portion with the friction portion can be reduced.

Peaks of crest portions of the crest and valley structure are obtuse peaks. With such a configuration, it is possible to further reduce marks formed on the diameter enlarged portion of the sleeve generated due to the generation of metal powder and contacting of the diameter enlarged portion with the friction portion can be reduced.

A recessed groove is formed on a start end surface and a terminal end surface of the diameter enlarging roller, and a shim is fitted into the recessed groove. With such a configuration, contacting between the diameter enlarging roller and the accommodating chamber which accommodates the diameter enlarging roller is alleviated by the shim. Accordingly, even when an eccentric load is applied to the diameter enlarging roller which performs a plastic deformation operation, a contact load generated between the diameter enlarging roller and the accommodating chamber can be reduced as much as possible. Accordingly, the displacement of the shim can be decreased due to the formation of the groove so that an operation of mounting the diameter enlarging roller can be performed easily.

To enable the detection of a fold-back amount of the lower end portion of the sleeve pipe, that is, an enlarged diameter amount of the sleeve pipe, the enlarged diameter amount detection mechanism is mounted on the proximal end operating portion of the roller shaft having the distal end on which the diameter enlarging roller is continuously formed, and the enlarged diameter amount detection mechanism is configured to indicate an elevation and a rotational amount of the roller shaft as an enlarged diameter amount by means of a scale marked on the enlarged diameter amount detection nut integrally formed with the roller shaft.

That is, a pull-up nut for pulling up the roller shaft is threadedly engaged with an upper end portion of the roller shaft, and the enlarged diameter amount detection nut is fitted into an upper portion of the pull-up nut such that the scale portion of the enlarged diameter amount detection nut is fitted on the pull-up nut. When the threadedly engaged roller shaft is elevated due to the rotation of the pull-up nut, the scale of the enlarged diameter amount detection nut is exposed from the inside of the pull-up nut corresponding to an elevation amount of the scale, that is, a fold-back amount or a diameter increasing amount of the sleeve, and the fold-back amount or the diameter increasing amount can be detected by reading the scale.

Particularly, by exposing the scale in this manner using a state where the start end flange portion of the diameter enlarging roller is brought into contact with the lower end of the sleeve as a "0 point" which is a reference point, the enlarged diameter amount of the sleeve can be checked accurately. In the case where the friction portion is formed on the roller, a slippage of the roller can be prevented and hence, the enlarged diameter amount can be measured with high accuracy.

MODE FOR CARRYING OUT THE INVENTION

Figure 1:
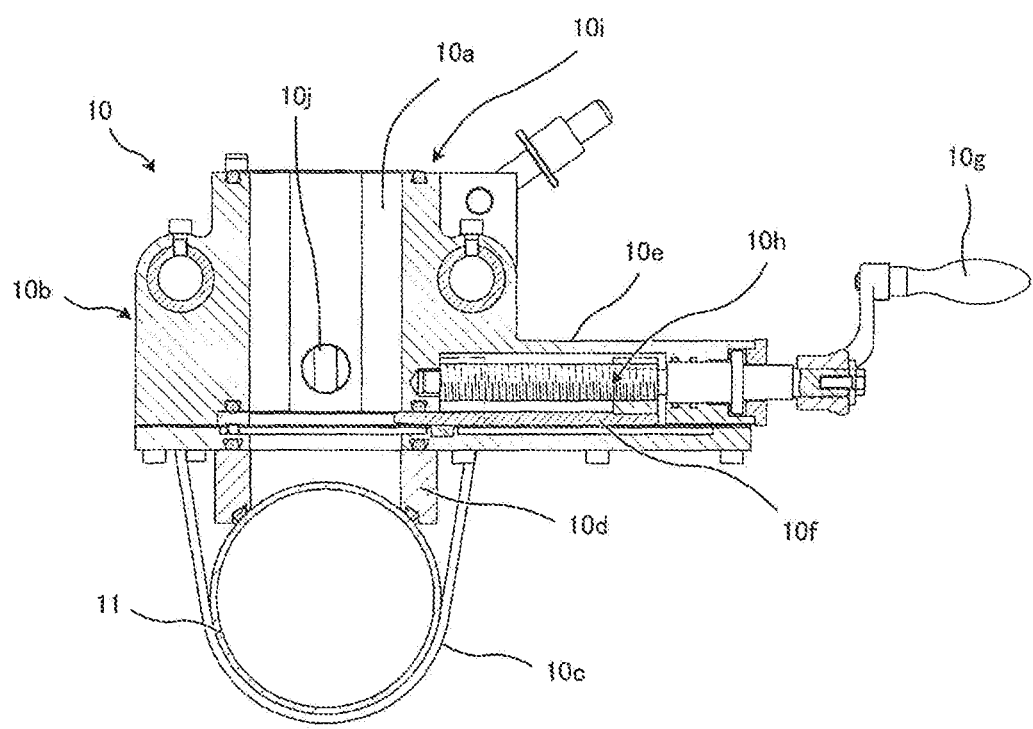
FIG. 1 is an explanatory view showing the configuration of a gate valve.

The present invention relates to, in a branching work performed without suspending the supply of water, a technique for forming a water diverting port in an outer peripheral wall of the water pipe by drilling and for communicably connecting a snap tap to the water diverting port.

That is, the present invention is directed to, for example, a snap tap mounting jig where a regeneration pipe is fitted on a deteriorated existing pipe thus forming a water pipe having a duplex pipe structure, a gate valve is fixedly attached to a peripheral wall of the water pipe in a communicable state, a water diverting port is formed by drilling the peripheral wall of the water pipe having a duplex pipe structure using a drill body of a drilling machine which advances and retracts in the inside of a water flow sleeve of the gate valve, the snap tap is mounted on the water diverting port by way of the gate valve without suspending the supply of water and, thereafter, the gate valve is removed and the water diverting port is completely sealed so that the snap tap is communicably connected to the water diverting port. Particularly, sealing of the water diverting port by rubber packing can be performed accurately without requiring an unnecessary diameter enlarging force by devising a shape or an inclination angle of the diameter enlarging roller used in a communicable connection operation of the snap tap.

That is, the technical features of the present invention are as follows. The diameter enlarging roller is formed into a Japanese-hand-drum shape having the recessed portion, and the recessed portion is formed such that the substantially upper half portion of the diameter enlarging roller mounted obliquely is formed into a substantially tapered shape, and the substantially lower half portion of the diameter enlarging roller mounted obliquely is formed into a substantially round shape. An inclination angle of the tapered portion of the diameter enlarging roller mounted obliquely falls within a range of an angle of from 65 degrees to 77 degrees. A recessed groove portion is formed on an upper end surface (start end surface) and a lower end surface (terminal end surface) of the diameter enlarging roller, and a shim is fitted into the recessed groove portion. The snap tap mounting jig comprises, for detecting an enlarged diameter amount of a distal end of the metal sleeve by the diameter enlarging roller, an enlarged diameter amount detection mechanism on a proximal end operating portion of a roller shaft having a distal end on which the diameter enlarging roller is continuously formed, and the enlarged diameter amount detection mechanism is configured to indicate an elevation and a rotational amount of the roller shaft as the enlarged diameter amount by means of a scale marked on an enlarged diameter amount detection nut integrally formed with the roller shaft.

Hereinafter, an embodiment according to the present invention is described with reference to attached drawings.

[1. Mounting of Gate Valve to Water Pipe]

FIG. 1 is an explanatory view showing a cross section of a water pipe 11 in a state where a gate valve 10 is mounted on the water pipe 11.

In this embodiment, to enable an installation operation of connecting a snap tap to the water pipe 11 without suspending the supply of water, firstly, the gate valve 10 is fixedly mounted on the water pipe 11 as shown in FIG. 1.

The gate valve 10 is provided for preventing a large amount of water from flowing out from the water pipe 11 during the installation work. With the use of the gate valve 10, in a case where a hole is formed in a peripheral wall of the water pipe 11 by advancing and retracting a drill portion 14b of a drilling machine 14 (see FIG. 2) in the inside of a jig insertion passage 10a of the gate valve 10 or in a case where a snap tap is communicably connected to a water diverting port by a snap tap mounting jig A according to the present invention (see FIG. 7), the presence or the non-presence of water flowing from the water diverting port can be controlled by opening or closing the gate valve 10 and hence, the installation work of a snap tap can be realized without suspending the supply of water.

[2. Gate Valve]

As shown in FIG. 1, the gate valve 10 is mounted on the water pipe 11 by fastening a gate valve body 10b onto the water pipe 11 using a chain 10c, a wire or the like.

A jig passing passage 10a is formed in a center portion of the gate valve body 10b, and the jig passing passage 10a is disposed at a position where a water diverting port is formed in a drilling processing step described later.

A terminal end of the jig passing passage 10a is stationarily disposed on the peripheral wall of the water pipe 11 by way of a leg sleeve 10d in a watertight manner.

A shutter 10f which opens or closes the jig passing passage 10a is mounted in a platform 10e of the gate valve body 10b in an advanceable and retractable manner. A base portion of the shutter 10f is configured to be operable in an advanceable and retractable manner by an opening/closing handle 10g by way of an advanceable and retractable screw portion 10h.

On an upper portion of the gate valve body 10b, a jig connecting flange 10i for mounting and fixing the snap tab mounting jig A according to the present invention is mounted.

Figure 2:
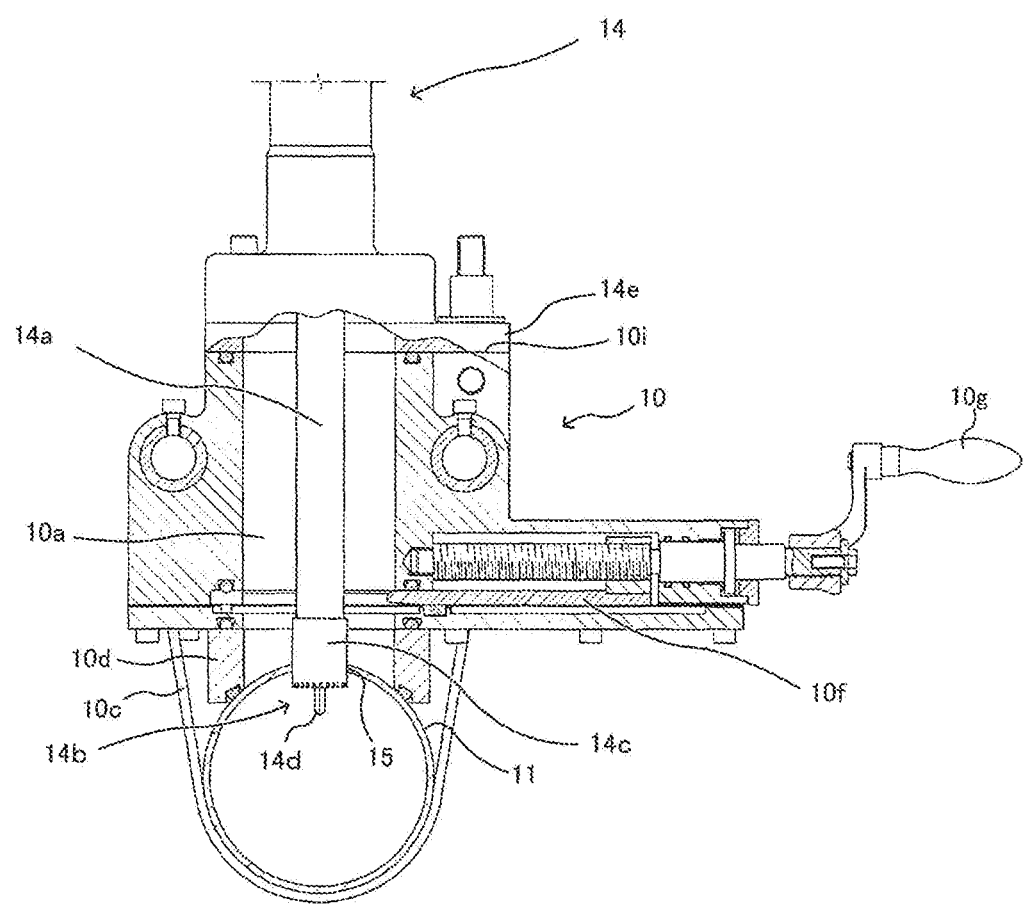
FIG. 2 is an explanatory view showing the configuration of the gate valve in a hole drilling state.

Accordingly, in performing an operation of communicably connecting the snap tap to the water pipe 11, firstly, the gate valve 10 having the above-mentioned structure is mounted and fixed to the water pipe 11, and a lower end flange 14a of the drilling machine 14 is connected and fixed to the jig connecting flange 10i formed on an upper portion of the gate valve 10 thus completing the preparation for an operation of forming a hole in the peripheral wall of the water pipe 11 by drilling (see FIG. 2).

[3. Drilling Processing Step]

FIG. 2 is an explanatory view for explaining a state where the drilling machine 14 is mounted on the gate valve 10. In FIG. 2, for the sake of convenience, the drilling machine 14 is shown in a state where an upper mechanism of the drilling machine 14 is omitted.

A drill shaft 14a of the drilling machine 14 is inserted into a jig insertion passage 10a of the gate valve 10, a drill portion 14b mounted on a distal end of the drill shaft 14a is brought into contact with a water diverting port forming position on the peripheral wall of the water pipe 11, and the water diverting port 15 is formed by drilling by a core drill 14c and a center drill 14d provided to the drill portion 14b.

In use, the shutter 10f of the gate valve 10 is opened, and the center drill 14d and the core drill 14c are advanced into the inside of the jig insertion passage 10a.

Then, the drill shaft 14a is advanced until a distal end of the center drill 14d penetrates a pipe wall of the water pipe 11 and, subsequently, while flowing out chips generated by cutting by overflowing water through a water drain port not shown in the drawing which is formed in the gate valve 10 additionally, a cutting edge of the core drill 14c is brought into contact with the pipe wall thus forming a circular hole by drilling as the water diverting port 15.

After the drilling is finished, the drill shaft 14a is elevated so as to remove the drill portion 14b together with the cut-out pipe wall from the inside of the jig insertion passage 10a, and the shutter 10f and the water drain port (not shown in the drawing) of the gate valve 10 are closed. Then, the drilling machine 14 is removed from the jig connecting flange 10i of the gate valve 10 thus completing the drilling processing step.

[4. Configuration of Snap Tap]

Figure 3A:
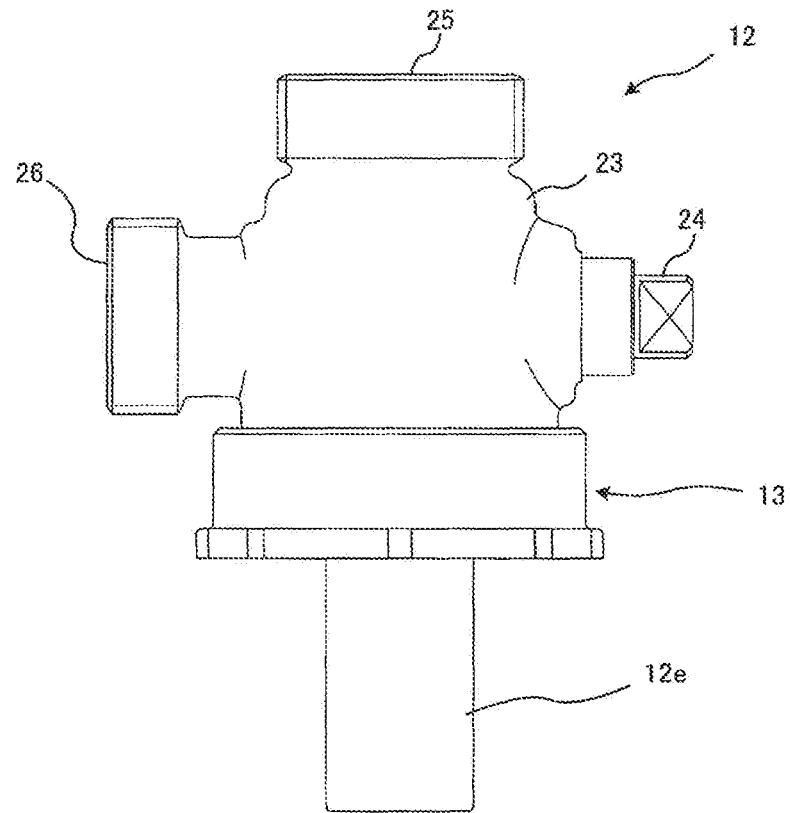
FIG. 3(a) and FIG. 3(b) are explanatory views showing the external appearance of a snap tap in a state where a cap nut is mounted on the snap tap.
Figure 3B:
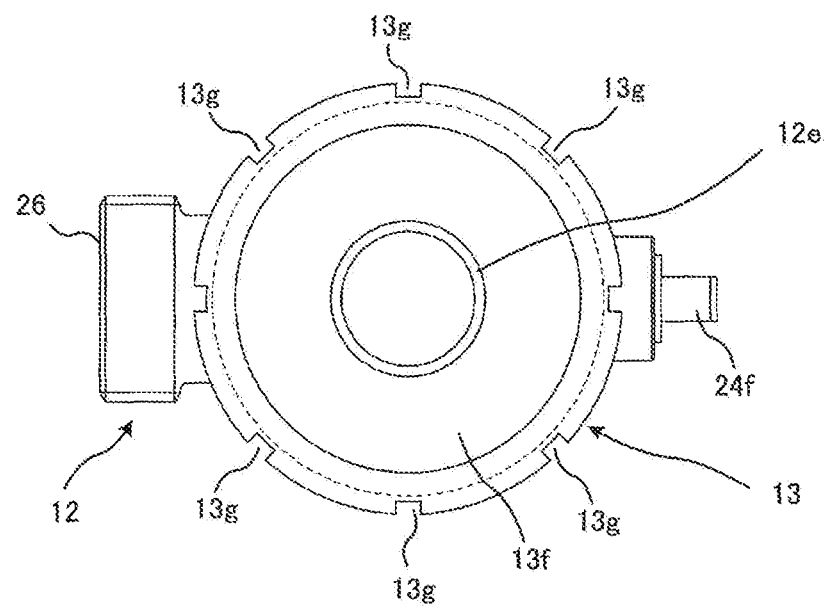
Figure 4:
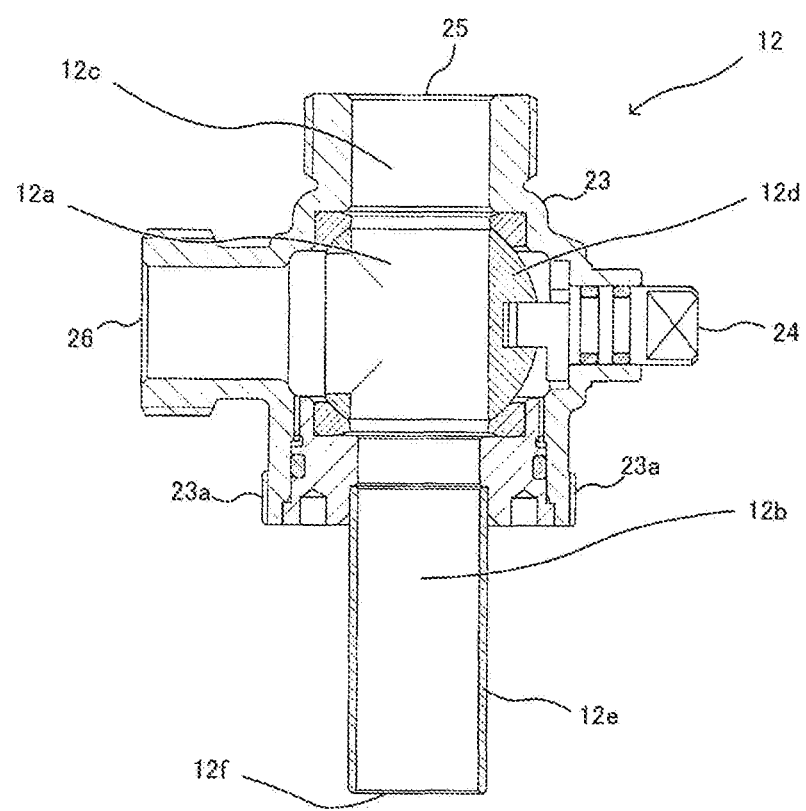
FIG. 4 is an explanatory view showing a cross section of the snap tap.

Next, the structure of the snap tap and the parts around the snap tap is described with reference to FIG. 3(a), FIG. 3(b) and FIG. 4. FIG. 3A and FIG. 3(b) are explanatory views showing the external appearance of the snap tap 12 in a state where the cap nut 13 described later is mounted on the snap tap 12. FIG. 4 is an explanatory view showing a cross section of the snap tap 12.

As shown in FIG. 3A and FIG. 3(b), the snap tap 12 includes: an upper water passing port 25 formed on an upper portion of a snap tap base body 23; and a side water passing port 26 formed on a side portion of the snap tap base body 23. By switching an opening and closing shaft 24, water supplied from a metal sleeve 12e side disposed on a lower portion of the snap tap base body 23 can be selectively supplied to the upper water passing port 25 or the side water passing port 26.

As can be also understood from FIG. 4, the snap tap 12 includes: a water passing sleeve 12a which forms a portion of a water passing pipe passage; a water inflow portion 12b and a water outflow portion 12c disposed in front of and behind the water passing sleeve 12a; and an approximately spherical valve element 12d disposed at the center of the water passing sleeve 12a. The snap tab 12 forms a ball valve having a water diverting function. That is, the snap tap 12 is configured such that the valve element 12d is disposed in the middle of the water passing sleeve 12a for allowing passing of water in the water passing pipe passage and for stopping the passing of water, and an opening or closing operation of a water diverting passage is performed by operating the opening and closing shaft 24 of the valve element 12d.

To further describe the snap tap 12, the snap tap 12 is disposed at a blanched portion which is communicably connected to the water diverting port 15 formed in the water pipe 11 and forms a blanched passage.

Although described in detail later, in the snap tap mounting jig A according to the present invention, a cylindrical metal sleeve 12e is inserted into the water diverting port together with a rubber packing 16 described later in a state where the metal sleeve 12e forms an integral part of the snap tap mounting jig A.

That is, the metal sleeve 12e is integrally connected to the water passing pipe passage of the snap tap 12. The metal sleeve 12e is inserted into the inside of the water pipe 11 in a penetrating and projecting manner from the water diverting port 15 together with the rubber packing 16 fitted on an outer periphery of the metal sleeve 12e. A projecting distal end portion of the metal sleeve 12e is bent and caulked to the water diverting port 15 by a diameter enlarging roller which forms a main part of the snap tap mounting jig A according to the present invention. With such a configuration, the snap tap 12 is connected and fixed to the water diverting port 15.

[5. Configuration of Rubber Packing]

Figure 5A:
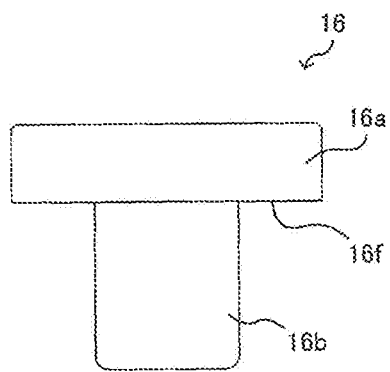
FIG. 5(a) and FIG. 5(b) are explanatory views showing the external appearance and the cross section of a rubber packing.

Next, the configuration of the rubber packing 16 mounted on the water diverting port 15 together with the metal sleeve 12e formed on the snap tap 12 is described with reference to FIG. 5(a) and FIG. 5(b). FIG. 5(a) shows the external appearance of the rubber packing 16, and FIG. 5(b) shows a cross section of the rubber packing 16.

Figure 5B:
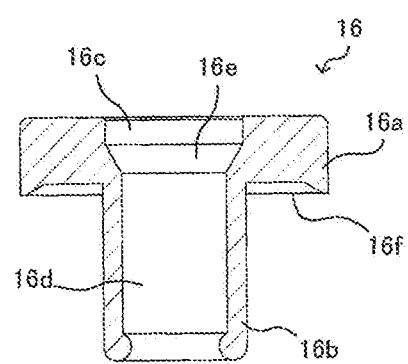

As shown in FIG. 5(a) and FIG. 5(b), the rubber packing 16 is formed of: a flange portion 16a which forms an upper half portion of the rubber packing 16; and a cylindrical mounting portion 16b which forms a lower half portion of the rubber packing 16. A loose fitting margin 16c is formed between an inner peripheral surface of the upper half portion and the metal sleeve 12e, and a fitting margin 16d is formed between an inner peripheral surface of the lower half portion and the metal sleeve 12e. On an inner boundary between the loose fitting margin 16c and the fitting margin 16d, a stepped tapered portion 16e is formed for allowing smooth passing of the metal sleeve 12e at the boundary portion when the metal sleeve 12e is inserted into the rubber packing 16.

Between the flange portion 16a and the mounting portion 16b on an outer side of the rubber packing 16, a locking stepped portion 16f is formed due to a difference in diameter between the flange portion 16a and the mounting portion 16b, and the locking stepped portion 16f is brought into contact with a periphery of and an area the water diverting port 15 and an area in the vicinity of the periphery. With such a configuration, it is possible to prevent the rubber packing 16 from falling into the inside of the water pipe 11.

[6. Configuration of Cap Nut]

Next, the configuration of the cap nut 13 shown in FIG. 3A and FIG. 3(b) together with the snap tap 12 is described with reference to FIG. 3A, FIG. 3(b), FIG. 4 and FIG. 6.

As shown in FIG. 3A and FIG. 3(b), the cap nut 13 is threadedly mounted on a lower portion of the snap tap base body 23. To be more specific, as shown in FIG. 4, male threads are formed on a peripheral surface of a lower portion of the snap tap base body 23 thus forming a cap nut threadedly engaging portion 23a with which the cap nut 13 is threadedly engaged.

The cap nut 13 is provided for compressing the rubber packing 16 interposed between the cap nut 13 and an outer surface of a pipe wall of the water pipe 11 at the time of mounting the snap tap 12 on the water diverting port 15 in a caulked state. The cap nut 13 functions as a member which ensures water tightness around the water diverting port 15 and the fixing of the snap tap 12 to the water pipe 11.

Figure 6:
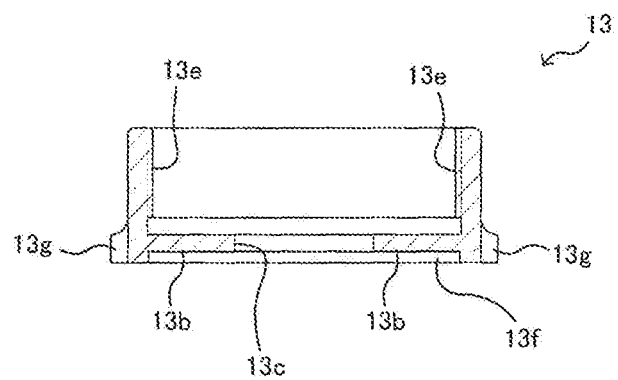
FIG. 6 is an explanatory view showing the configuration of the cap nut.

To be more specific, as shown in FIG. 6, a sleeve insertion hole 13c which allows the insertion of the above-mentioned metal sleeve 12e of the snap tap 12 therethrough is formed at the center of the cap nut 13. Numeral 13(b) indicates a cap surface of the cap nut 13.

A female threaded portion 13e is formed on an inner surface of the cap nut 13, and the female threaded portion 13e is threadedly engaged with the cap nut threadedly engaging portion 23a formed on the peripheral surface of the snap tap base body 23. With such a configuration, a space formed in the inside of the cap nut 13 and disposed above the cap surface 13b is formed as a space where the cap nut 13 and the snap tap base body 23 are engaged with each other by fitting engagement.

A rubber packing fitting portion 13f having a recessed shape in which the flange portion 16a of the rubber packing 16 is to be fitted is formed on an outer surface of the cap surface 13b of the cap nut 13.

A fastening jig engaging portion 13g having a peripheral surface on which engaging grooves are formed is formed on a peripheral wall of a lower portion of the cap nut 13. The fastening jig engaging portion 13g is formed so as to be engaged with a fastening jig at the time of making the snap tap base body 23 (snap tap 12) and the cap nut 13 threadedly engage with each other.

Accordingly, when a water diverting work is completed by communicably connecting the snap tap 12 to the water pipe 11 by way of the water diverting port 15 as described later, as a matter of course, the snap tap mounting jig A is removed. At this point of the work, the following operation is performed so as to ensure sealing of the snap tap 12 by the rubber packing 16. A fastening jig such as a wrench, for example, is engaged with the fastening jig engaging portion 13g of the cap nut 13, and the cup nut 13 threadedly engaged with a lower portion of the snap tap 12 is rotated. Due to the rotation of the cap nut 13, the cap nut 13 is slidably moved relative to the snap tap base body 23 along an axial direction of the rubber packing 16 fitted on the metal sleeve 12e.

Accordingly, the snap tap 12 is in a state where the snap tap 12 is mounted on the water diverting port 15 in a caulked state as described previously. Accordingly, when the fastening jig engaging portion 13g of the cap nut 13 is rotatably operated in a threaded engagement releasing direction by a wrench or the like, the cap nut 13 is slidably moved toward a water pipe 11 side (that is, in a direction away from the snap tap base body 23) at a threadedly engaged portion of the cap nut 13 with a lower portion of the snap tap base body 23 and hence, the flange portion 16a of the head portion of the rubber packing 16 is compressed between the cap nut 13 and the outer surface of the pipe wall of the water pipe 11.

[7. Snap Tap Mounting Jig]

Next, the snap tap mounting jig A according to this embodiment is described with reference to FIG. 7 to FIG. 10(d). Hereinafter, the snap tap mounting jig A according to this embodiment is described as a jig which is used in the water diverting port 15 formed in a longitudinal direction. That is, the description is made with respect to the case where the snap tap mounting jig A is used in the vertical snap tap mounting structure where the snap tap 12 is communicably connected to a horizontally-arranged water pipe 11 right above the water pipe 11, and the rubber packing 16 and the metal sleeve 12e are mounted on the water diverting port 15 formed in the peripheral wall of the water pipe 11 from the vertical direction and, in such a state, the rubber packing 16 and the metal sleeve 12e are caulked.

Figure 7:
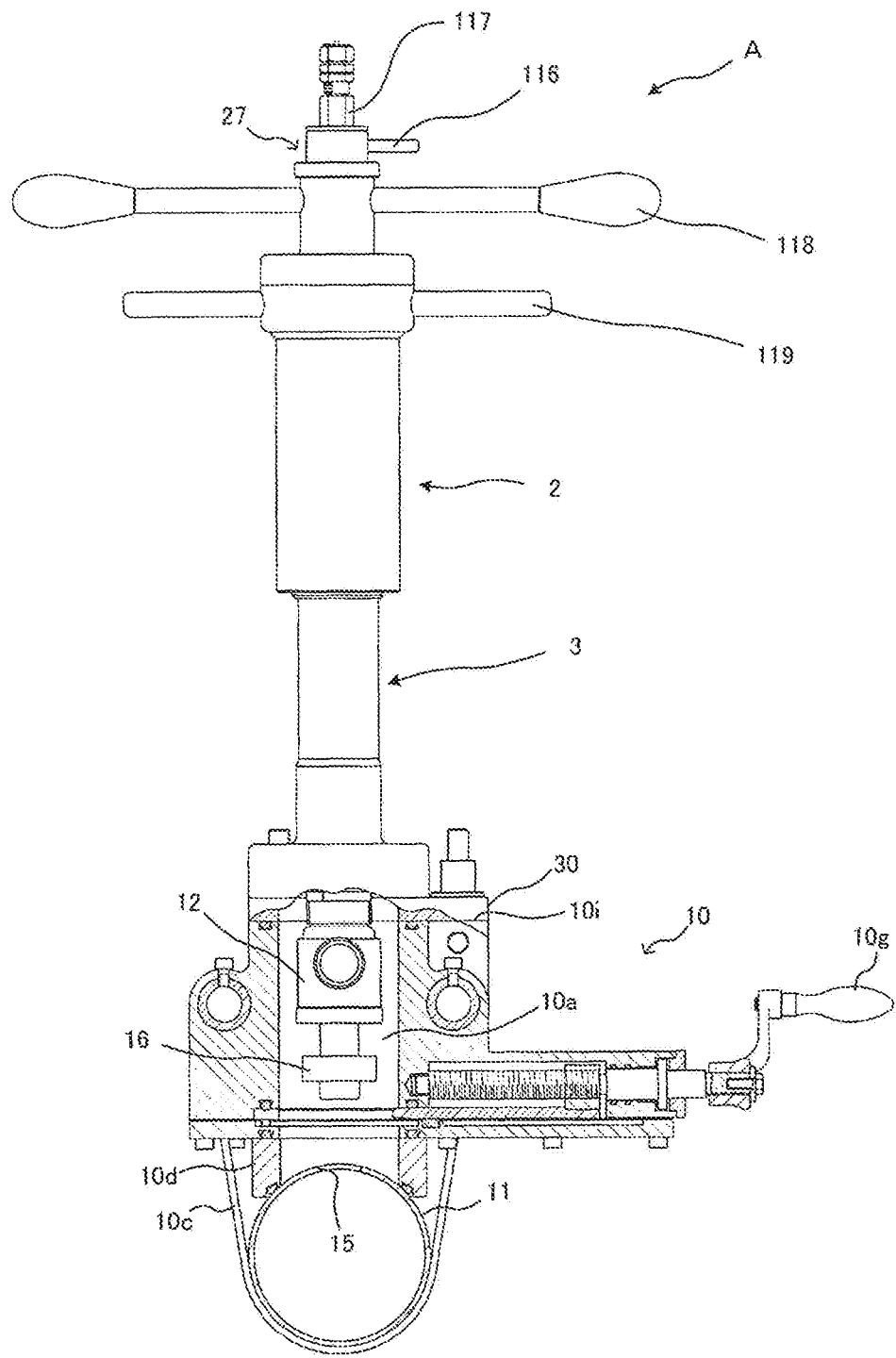
FIG. 7 is an explanatory view showing a state where a snap tap mounting jig is disposed on the gate valve.
Figure 8A:
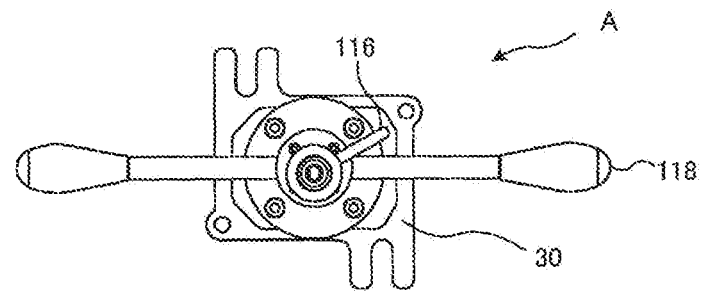
FIG. 8(a) and FIG. 8(b) are explanatory views showing the external appearance of the snap tap mounting jig according to this embodiment.
Figure 8B:
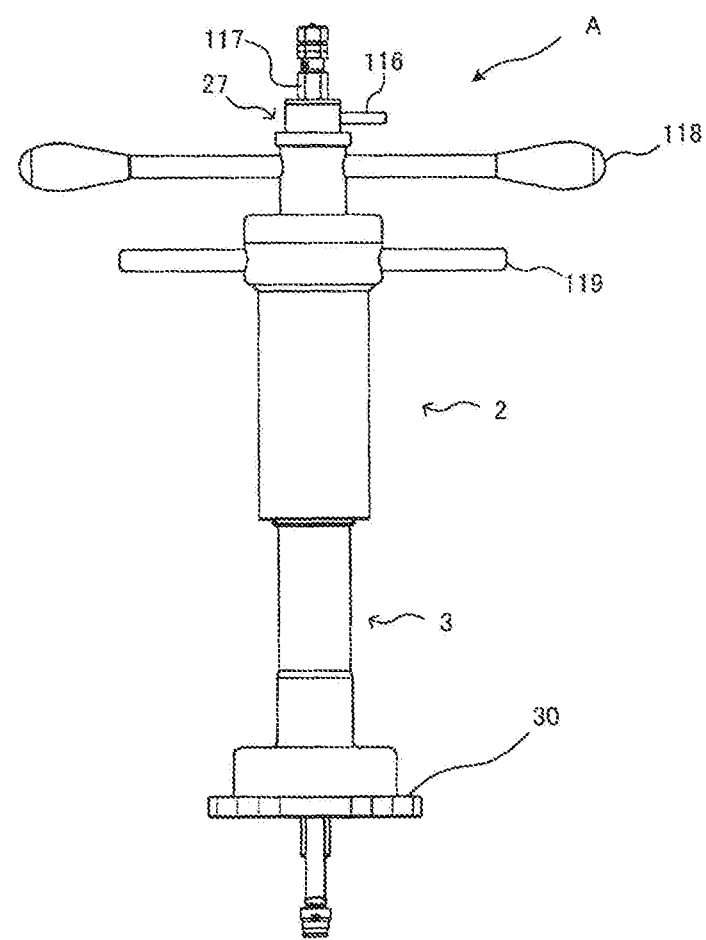
Figure 9:
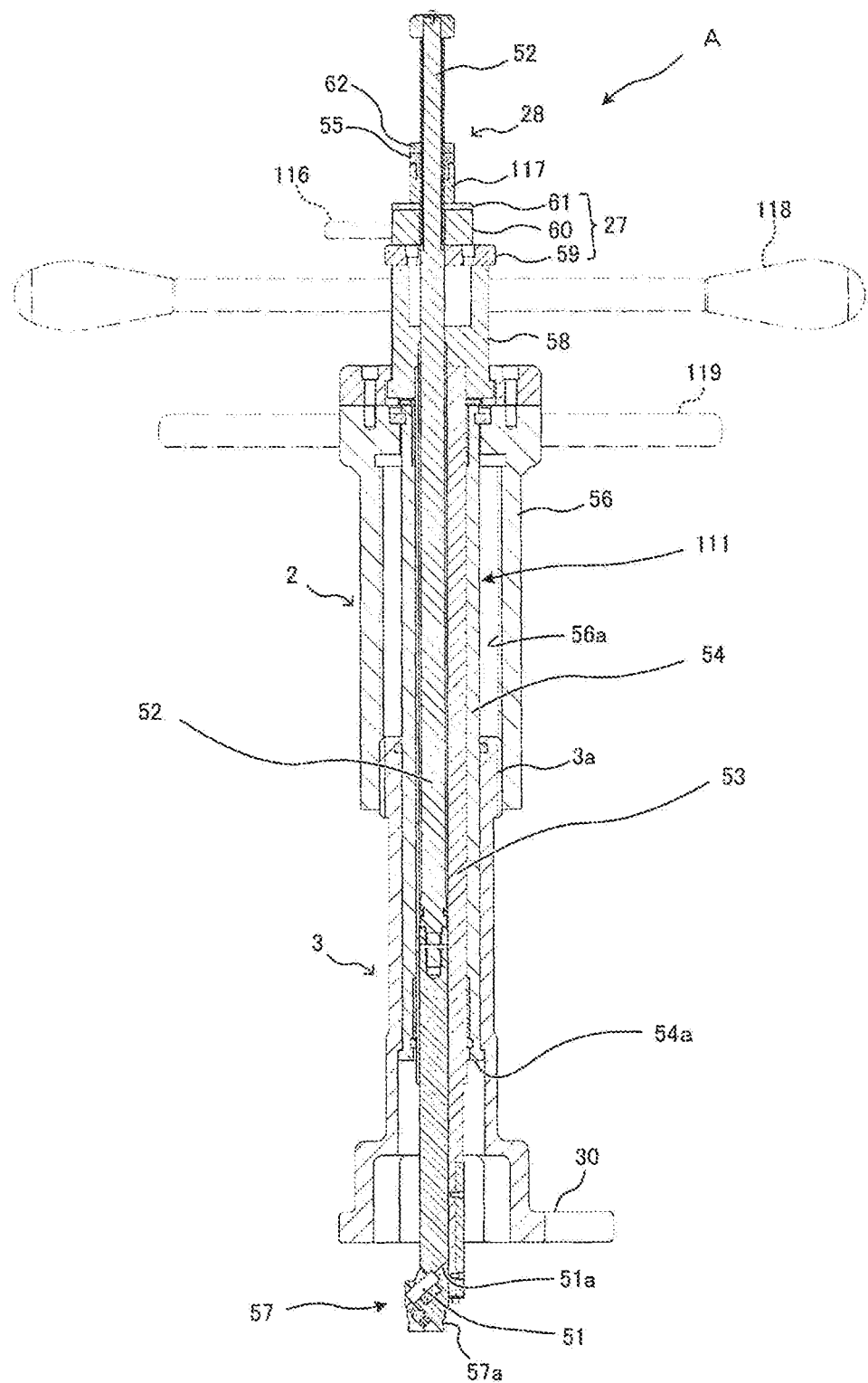
FIG. 9 is an explanatory view showing the configuration of the snap tap mounting jig according to this embodiment.

FIG. 7 is a cross-sectional view showing a state where the snap tap mounting jig A is mounted on and fixed to the gate valve 10, FIG. 8(a) and FIG. 8(b) are explanatory views showing the external appearance of the snap tap mounting jig A, and FIG. 9 is an explanatory view showing the cross-sectional structure of the snap tap mounting jig A.

As shown in FIG. 7, FIG. 8(a) and FIG. 8(b), a handle operating mechanism where various kinds of handles (an elevating and lowering handle 119, a diameter enlarging handle 118) are collectively arranged is disposed on an upper portion of the snap tap mounting jig A according to this embodiment. This handle operating mechanism is mounted on an upper elevating and lowering body 2.

As shown in FIG. 9, the upper elevating and lowering body 2 is formed of: a pressing shaft elevating and lowering guide 56; a main shaft 111; a diameter enlarging operating shaft 58; an integral locking mechanism 27; a pull-up nut 117; and an enlarged diameter amount detection mechanism 28.

The pressing shaft elevating and lowering guide 56 is an approximately cylindrical member having an inner peripheral surface on which female threads 56a are formed, and is threadedly engageable with male threads 3a formed on an outer peripheral surface of a diameter enlarging device body 3. As shown in FIG. 8(a) and FIG. 8(b), a lower end flange 30 is formed on a lower portion of the diameter enlarging device body 3, and the diameter enlarging device body 3 is integrally connectable to the jig connecting flange 10i formed on the upper portion of the gate valve 10 by way of the lower end flange 30. Accordingly, along with the rotation of the pressing shaft elevating and lowering guide 56, the whole upper elevating and lowering body 2 is elevated or lowered relative to the diameter enlarging device body 3 mounted on and fixed to the jig connecting flange 10i.

Figure 10A:
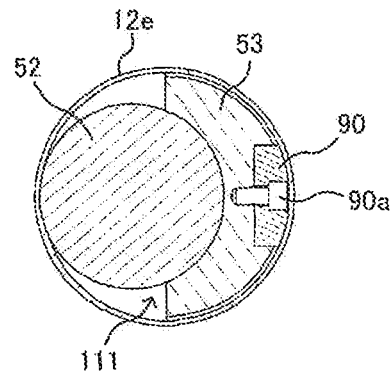
FIG. 10(a) to FIG. 10(d) are explanatory views showing the configuration of a diameter enlarging head of the snap tap mounting jig and parts in the vicinity of the diameter enlarging head.

The main shaft 111 is formed of: a sleeve pushing pipe 54 which extends downward from the center of the snap tap mounting jig A in a longitudinal direction; an eccentrically movable shaft 52 which forms a roller shaft passing through the inside of the sleeve pushing pipe 54; and an eccentrically movable bearing 53 which is interposed in a cross-sectional space formed between the eccentrically movable shaft 52 and the sleeve pushing pipe 54 and stably supports the eccentrically movable shaft 52 in the inside of the sleeve pushing pipe 54 (see FIG. 10(a)).

As shown in FIG. 9, a lower portion of the sleeve pushing pipe 54 is formed into a cylindrical shape having a wall thickness larger than a wall thickness of an upper portion of the sleeve pushing pipe 54, and a contact end 54a formed on a lower end of the sleeve pushing pipe 54 is configured to be brought into contact with an upper portion of the snap tap 12 (an edge portion of the upper water passing port 25).

A diameter enlarging head 57 which is rotated simultaneously due to the rotation of the eccentrically movable shaft 52 is connected to a lower end of the eccentrically movable shaft 52 which passes through the sleeve pushing pipe 54. As shown in FIG. 7, the rubber packing 16 is detachably mounted on a recessed portion 57a formed on a peripheral surface of a lower portion of the diameter enlarging head 57 together with the snap tap 12. In such a state, the rubber packing 16 is in a state where the rubber packing 16 is also fitted on an outer periphery of the metal sleeve 12e of the snap tap 12.

A diameter enlarging roller 51 is mounted on the diameter enlarging head 57 obliquely toward an oblique upward direction. The diameter enlarging roller 51 forms one of technical features of the present invention, and is described in detail later.

The eccentrically movable shaft 52 rotates at the position eccentric from the center of the main shaft 111. Accordingly, the diameter enlarging roller 51 obliquely mounted on the diameter enlarging head 57 is projectable to the outside of an outer diameter of the main shaft 111, that is, to the outside of an outer diameter of the sleeve pushing pipe 54, and is retractable to the inside of the outer diameter of the main shaft 111, that is, to the inside of the outer diameter of the sleeve pushing pipe 54.

That is, when the diameter enlarging roller 51 is retracted to the cross-sectional space formed between the eccentrically movable shaft 52 and the sleeve pushing pipe 54, the diameter enlarging head 57 can pass through the water diverting port 15 while keeping such a state. Thereafter, by allowing the diameter enlarging roller 51 to advance forward from the water diverting port 15 and by rotating the diameter enlarging roller 51, the diameter enlarging roller 51 is brought into a state where the diameter enlarging roller 51 projects outward from the cross-sectional space formed between the eccentrically movable shaft 52 and the sleeve pushing pipe 54.

In this manner, the diameter enlarging roller 51 can be displaced to a position where the diameter enlarging roller 51 can caulk the rubber packing 16 and the metal sleeve 12e which are positioned around the water diverting port 15.

As shown in FIG. 10(a) to FIG. 10(d), a slide member 90 for preventing a seizure brought about by a friction between an outer peripheral surface of the eccentrically movable bearing 53 and an inner peripheral surface of the metal sleeve 12e is mounted on the outer peripheral surface of the eccentrically movable bearing 53 which is brought into contact with the inner peripheral surface of the metal sleeve 12e. The seizure preventing slide member 90 is formed of an elongated plate member having an arcuate shape on one side, is mounted on a portion of a peripheral surface of the eccentrically movable bearing 53 by bolts 90a. The slide member 90 is made of MC nylon so that the slide member 90 is smoothly slidable in the metal sleeve 12e.

As shown in FIG. 9, on an upper portion of the snap tap mounting jig A, handles for respectively operating the sleeve pushing pipe 54, the eccentrically movable shaft 52, the eccentrically movable bearing 53 and the like which form the main shaft 111 are collectively arranged as the handle operating mechanism. Symbol 118 indicates a diameter enlarging handle, and symbol 119 indicates an elevating and lowering handle. A head advancing and retracting lever 116 is disposed above the diameter enlarging handle 118, and the pull-up nut 117 is threadedly engaged with the eccentrically movable shaft 52 above the head advancing and retracting lever 116.

The head advancing and retracting lever 116 is provided for advancing or retracting the diameter enlarging roller 51 which is mounted on the diameter enlarging head 57 obliquely to the outside or the inside of the outer diameter of the main shaft 111 by eccentrically rotating the eccentrically movable shaft 52. The head advancing and retracting lever 116 is disposed on the key connection block 60 which forms an integral locking mechanism 27 described later.

The pull-up nut 117 is provided for performing a pull-up operation of the eccentrically movable shaft 52, mainly, a pull-up operation of the diameter enlarging head 57 which advances to the outside of the outer diameter of the main shaft 111. With a pull-up operation using the pull-up nut 117, a distal end opening portion of the metal sleeve 12e which is made to project into the inside of the water pipe 11 is deformed by being applied with a predetermined pressure corresponding to a pull-up amount of the pull-up nut 117 by the diameter enlarging roller 51 obliquely mounted on the diameter enlarging head 57.

The diameter enlarging handle 118 is provided for rotating the main shaft 111 in a state where the diameter enlarging roller 51 obliquely mounted on the diameter enlarging head 57 is brought into contact with an opening portion of the distal end of the metal sleeve 12e. The diameter enlarging handle 118 is disposed on a diameter enlarging operating shaft 58 connected to an upper portion of the main shaft 111.

While rotating the main shaft 111 by the diameter enlarging handle 118, a pulling force of the eccentrically movable shaft 52 generated by the above-mentioned pull-up nut 117 is applied to an end portion of the metal sleeve 12e so that the distal end portion of the opening of the metal sleeve 12e is bent toward the outside in a folded-back state. That is, the diameter enlarging handle 118 is disposed on the diameter enlarging operating shaft 58 formed on an upper end of a pressing shaft elevating and lowering guide 56, and functions as a handle for rotating the main shaft 111 about an axis of the main shaft 111.

As shown in FIG. 9 and FIG. 11(a) to FIG. 13(b), the integral locking mechanism 27 is formed of: a key block 59 fixedly mounted on an upper end surface of the diameter enlarging operating shaft 58; a key connecting block 60 connected to an upper end surface of the key block 59 in an interlocking manner; and a washer 61 disposed on an upper surface of the key connecting block 60 in an overlapping manner.

Figure 11A:
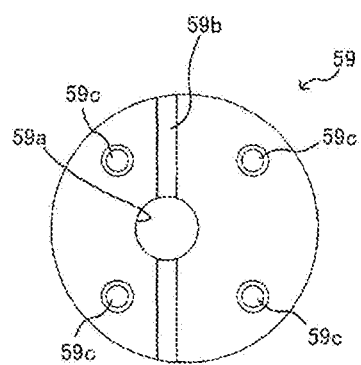
FIG. 11(a) and FIG. 11(b) are explanatory views showing the configuration of a key block.
Figure 11B:
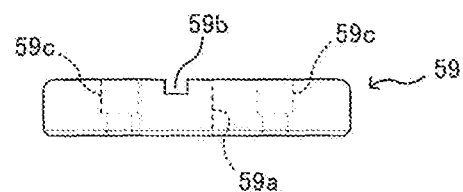

As shown in FIG. 11(a) and FIG. 11(b), an eccentrically movable shaft passing hole 59a is formed in the key block 59 at an eccentric position from the center of the key block 59, engaging grooves 59b which communicate with the eccentrically movable shaft passing hole 59a are formed on an upper surface of the key block 59, and bolt holes 59c used for integrally connecting the key block 59 to the diameter enlarging operation shaft 58 disposed below the key block 59 are formed in the key block 59 in the vicinity of a periphery of the key block 59.

Figure 12A:
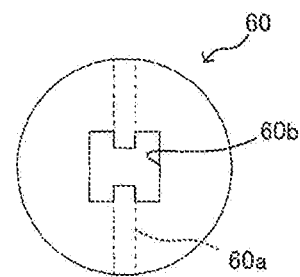
FIG. 12(a) and FIG. 12(b) are explanatory views showing the configuration of a key connecting block.
Figure 12B:
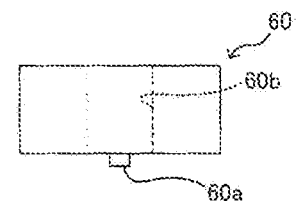
Figure 13A:
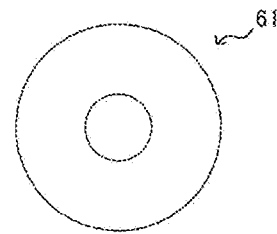
FIG. 13(a) and FIG. 13(b) are explanatory views showing the configuration of a washer.
Figure 13B:
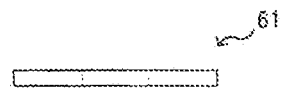

As shown in FIG. 12(a) and FIG. 12(b), tenons 60a are formed on a lower surface of the key connecting block 60 in a projecting manner. In a state where the key connecting block 60 is made to overlap with the key block 59 disposed below the key connecting block 60, the tenons 60a engage with the engaging grooves 59b formed in the key block 59 thus forming an integral locking mechanism 27 where the key block 59 and the key connecting block 60 are rotated integrally. An H-shaped engaging hole 60b is formed at the center of the key connecting block 60. The eccentrically movable shaft 52 passes through the H-shaped engaging hole 60b and engages with the H-shaped engaging hole 60b in a state where the key connecting block 60 and the eccentrically movable shaft 52 are simultaneously and integrally rotated with each other and, at the same time, the eccentrically movable shaft 52 can be vertically elevated and lowered.

As shown in FIG. 7, the snap tap mounting jig A having such a configuration is integrally connected to the gate valve 10 in such a manner that the lower end flange 30 formed on a lower end of the cylindrical diameter enlarging device body 3 is placed on and fixed to the jig connecting flange 10i of the gate valve 10.

In such a state, a hollow portion of the diameter enlarging device body 3 communicates with the jig passing passage 10a of the gate valve 10, and the diameter enlarging head 57 which passes through the inside of the diameter enlarging device body 3 passes the jig passing passage 10a of the gate valve 10 and advances to the water diverting port 15 of the water pipe 11 together with the snap tap 12 and the rubber packing 16.

[8. Step of Forming Snap Tap]

Figure 14:
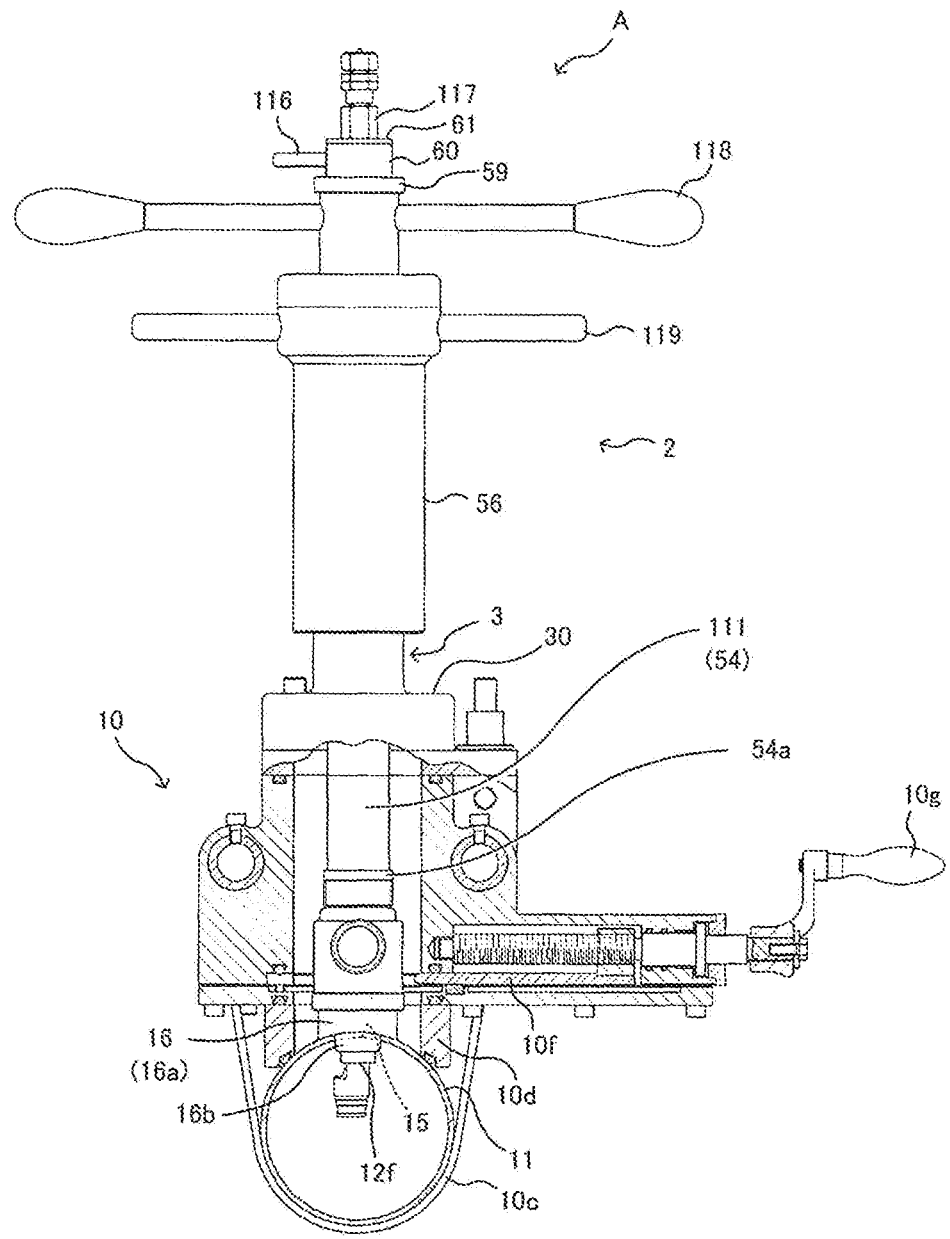
FIG. 14 is an explanatory view showing a step of mounting the snap tap on a water diverting port.

As shown in FIG. 14, the rubber packing 16 on the lower end of the main shaft 111 moves to the water diverting port 15 below the rubber packing 16 due to a lowering action of the above-mentioned elevating and lowering mechanism.

Then, a flange portion 16a of the rubber packing 16 is brought into contact with a peripheral wall surface of the water diverting port 15 by the contact end 54a of the sleeve pushing pipe 54 and, thereafter, by further pushing the flange portion 16a so as to compress the flange portion 16a, a mounting portion 16b of the rubber packing 16 is inserted into the water diverting port 15.

Further, when the metal sleeve 12e is pushed into the rubber packing 16 using the sleeve pushing pipe 54 by lowering the main shaft 111 in a state where the contact end 54a of the sleeve pushing pipe 54 and an upper portion of the snap tap 12 provided with the metal sleeve 12e are brought into contact with each other, the distal-end opening portion 12f of the metal sleeve 12e passes the inner periphery of the rubber packing 16 and projects to the inside of the water pipe 11.

At this stage of the operation, the diameter enlarging head 57 disposed on the lower end of the main shaft 111 is brought into a state where the diameter enlarging head 57 projects to the further inside of the water pipe 11 from the water diverting port 15 than the distal-end opening portion 12f of the metal sleeve 12e which projects to the inside of the water pipe 11 from the water diverting port 15. In such a state, the diameter enlarging head 57 is brought into a state where the diameter enlarging roller 51 mounted on the diameter enlarging head 57 obliquely is retracted to the inside of the outer diameter of the main shaft 111.

Subsequently, by rotating the eccentrically movable shaft 52 by an approximately 180 degrees using the head advancing and retracting lever 116, the diameter enlarging roller 51 mounted on the diameter enlarging head 57 obliquely is made to advance to the outside of the outer diameter of the main shaft 111. Further, by operating the pull-up nut 117, the diameter enlarging roller 51 is brought into contact with the distal-end opening portion 12f of the metal sleeve 12e by a predetermined pressure.

Figure 15:
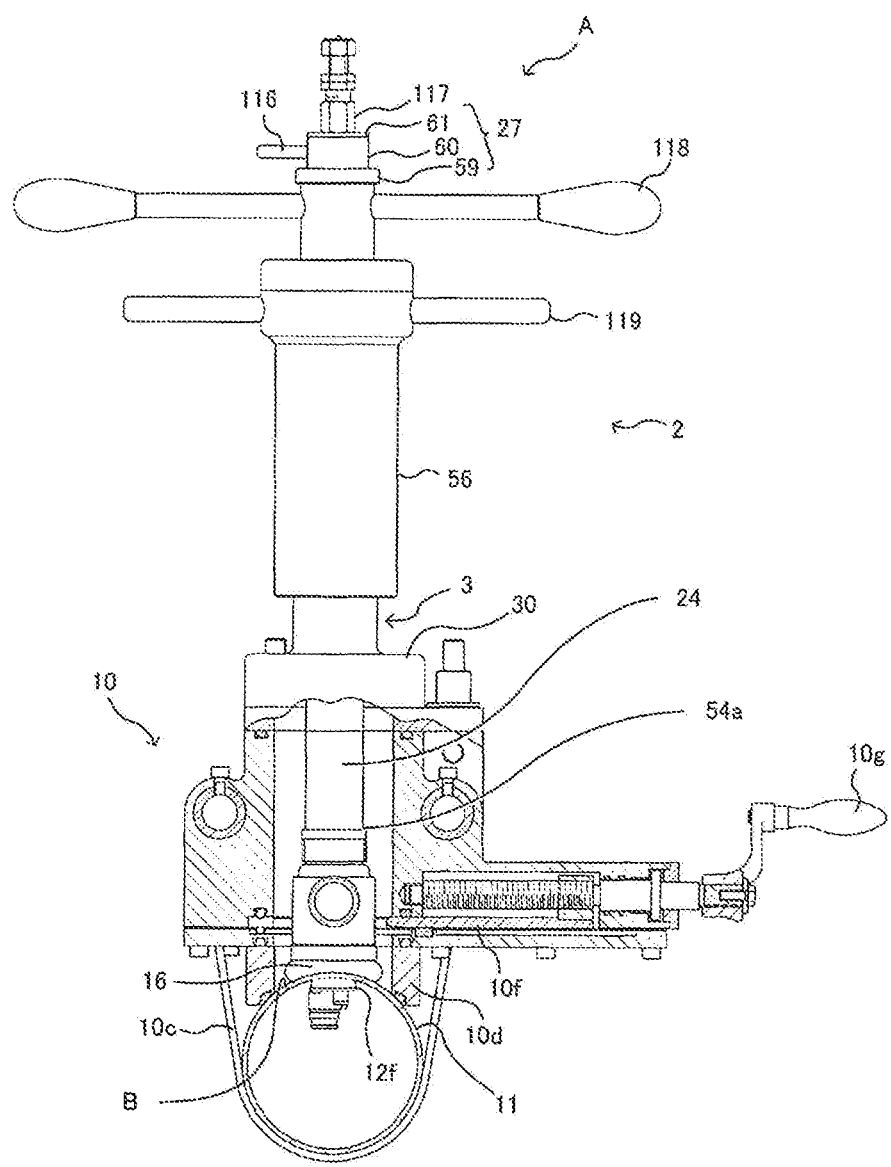
FIG. 15 is an explanatory view showing the step of mounting the snap tap on the water diverting port.

Further, by operating an integral lock mechanism 27, the eccentrically movable shaft 52 and the eccentrically movable bearing 53 are locked such that the eccentrically movable shaft 52 and the eccentrically movable bearing 53 are rotated integrally with each other, and by rotating the diameter enlarging handle 118, the eccentrically movable shaft 52 and the eccentrically movable bearing 53 are rotated integrally with each other. By repeating such an operation a predetermined number of times, as shown in FIG. 15, a diameter of the distal-end opening portion 12f of the metal sleeve 12e is expanded in a downwardly spreading manner so that the metal sleeve 12e is caulked to the water diverting port 15 of the water pipe 11 together with the rubber packing 16. That is, by rotating the main shaft 111 while bringing the diameter enlarging roller 51 into contact with an outer peripheral edge of the distal-end opening portion 12f of the metal sleeve 12e which projects to the inside of the water pipe 11 in a state where the diameter enlarging roller 51 advances to the outside of the outer diameter of the main shaft 111, the distal-end opening portion 12f of the metal sleeve 12e can be folded toward the outside in a fold-back manner.

When the diameter enlarging operation is finished, a pressure applied to the distal-end opening portion 12f is released by operating the pull-up nut 117 thus releasing the integral locking mechanism 27, and in such a state, the diameter enlarging roller 51 is retracted to the inside of the outer diameter of the main shaft 111 by operating the head advancing and retracting lever 116. Then, the main shaft 111 is pulled up by operating the elevating and lowering handle 119 of the elevating and lowering mechanism, the shutter 10f of the gate valve 10 is advanced to the position where the shutter 10f closes the jig insertion passage 10a thus shutting off the flow of water from the water pipe 11. The gate valve 10 is brought into a water stop state by operating the opening and closing shaft 24 of the snap tap 12 mounted on the water diverting port 15 by way of a stem opening/closing handle 10j mounted on the gate valve 10.

Finally, the snap tap mounting jig A mounted on the jig connecting flange 10i of the gate valve 10 is removed, and the gate valve 10 per se is also removed from the water pipe 11. Thereafter, a fastening jig is engaged with the fastening jig engaging portion 13g of the cap nut 13 and the rubber packing 16 is further compressed by the cap nut 13 thus finishing an operation of forming the snap tap 12.

Figure 16:
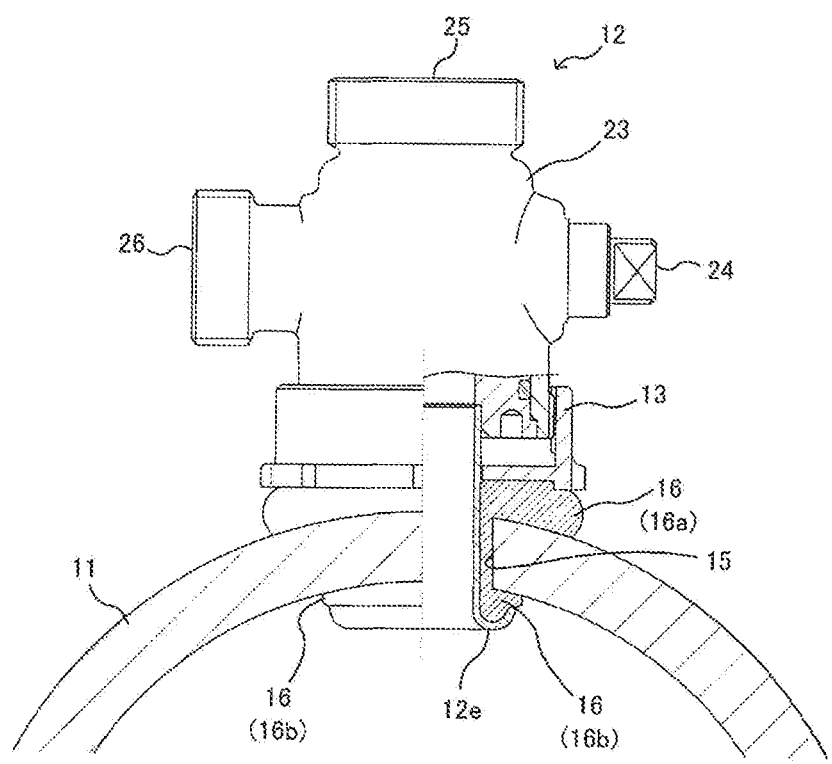
FIG. 16 is an explanatory view showing the step of mounting the snap tap on the water diverting port.

That is, as shown in FIG. 16, by enlarging a diameter of the distal-end opening portion 12f of the metal sleeve 12e in a downwardly spreading manner, the snap tap 12 where the metal sleeve 12e is integrally caulked to the water diverting port 15 of the water pipe 11 together with the rubber packing 16 is formed.

[9. Configuration of Diameter Enlarging Roller]

Next, the configuration of the diameter enlarging roller 51 which constitutes the technical feature of the present invention is described with reference to FIG. 10(a) to FIG. 10(d) and FIG. 17(a) to FIG. 17(c).

According to the diameter enlarging roller 51 of this embodiment described heretofore, a diameter of the distal-end opening portion 12f of the metal sleeve 12e can be enlarged with a small rotational force. Further, a possibility of buckling which may occur at the time of enlarging the diameter of the distal-end opening portion 12f of the metal sleeve 12e can be eliminated so that accuracy of an enlarged diameter amount can be enhanced.

Figure 10B:
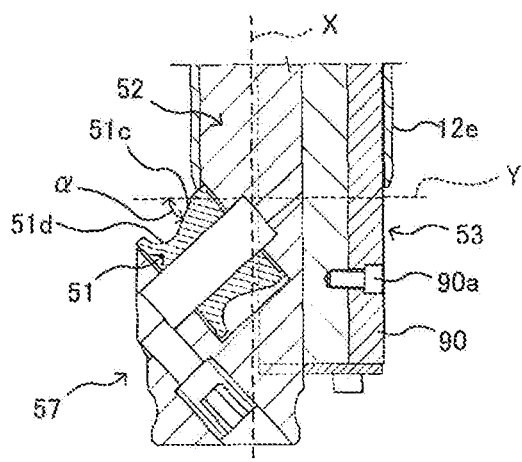
Figure 10C:
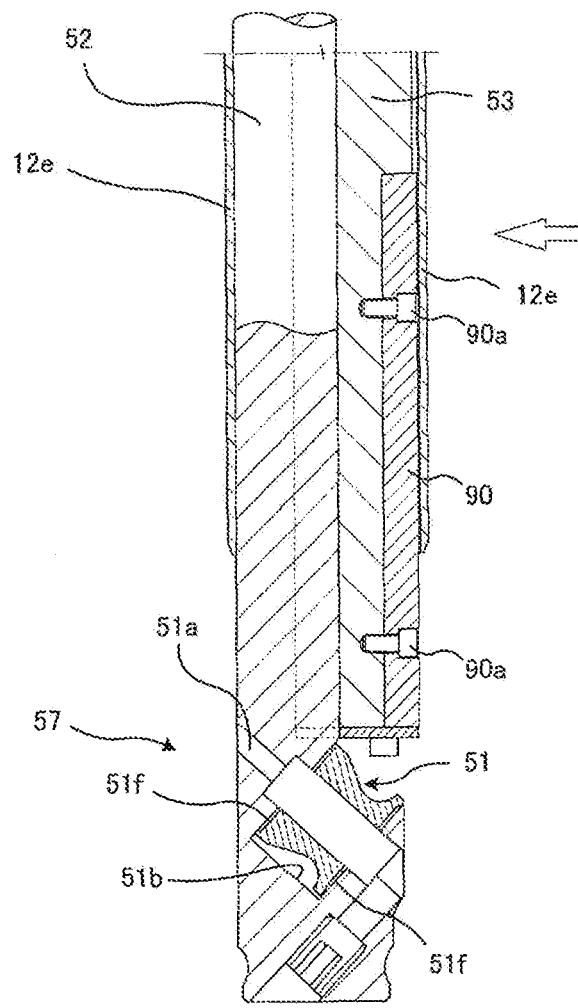
Figure 10D:
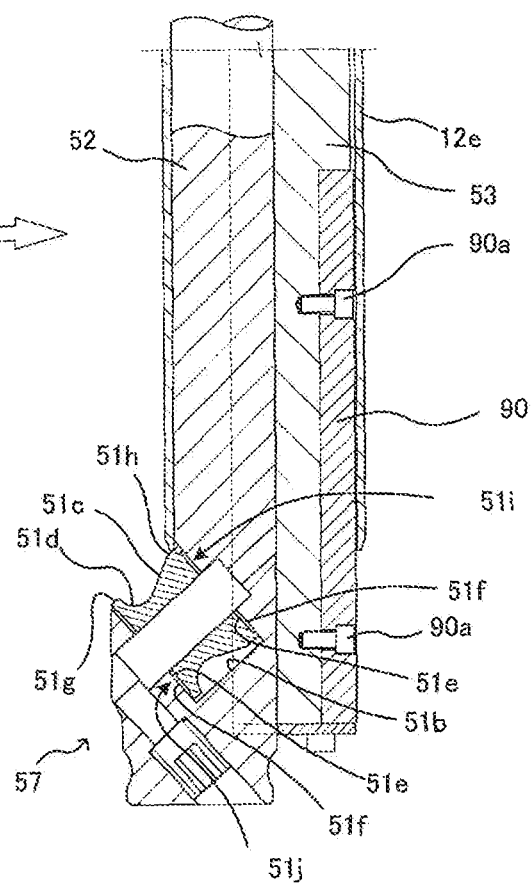

As shown in FIG. 10(b) to FIG. 10(d), according to the present invention, a peripheral surface of the diameter enlarging roller 51 is formed into a recessed portion having a Japanese-hand-drum shape (hyperbolic shape), a roller shaft 51a of the diameter enlarging roller 51 is disposed in a spanning manner in a roller accommodating chamber 51b which is formed in the diameter enlarging head 57 obliquely, and the diameter enlarging roller 51 is mounted on the roller shaft 51a obliquely.

A substantially upper half portion of the recessed portion of the peripheral surface of the diameter enlarging roller 51 mounted obliquely is formed as a tapered portion 51c, and a substantially lower half portion of the recessed portion of the diameter enlarging roller 51 mounted obliquely is formed as a rounded portion 51d. Accordingly, the substantially upper half portion forms an inclined straight flat surface, and the rounded portion 51d is contiguously formed with an end edge of the substantially upper half portion. Further, as shown in FIG. 10(b), an inclination angle of the obliquely mounted diameter enlarging roller 51 is set such that an angle α made between an imaginary straight line Y orthogonal to an axis X of the eccentrically movable shaft 52 (main shaft 111) and the tapered portion 51c (angle of depression a) falls within a range of from 65 degrees to 77 degrees.

Figure 17A:
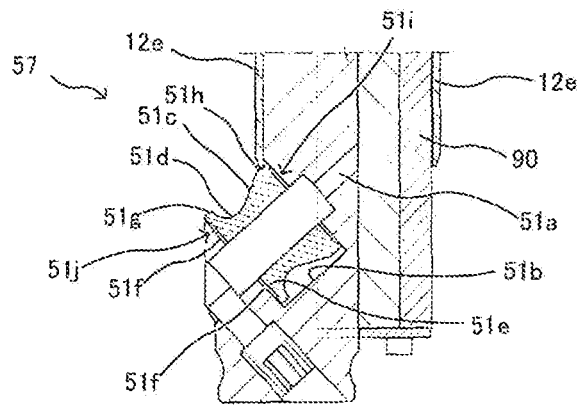
FIG. 17(a) to FIG. 17(c) are explanatory views showing a step of caulking a sleeve.
Figure 17B:
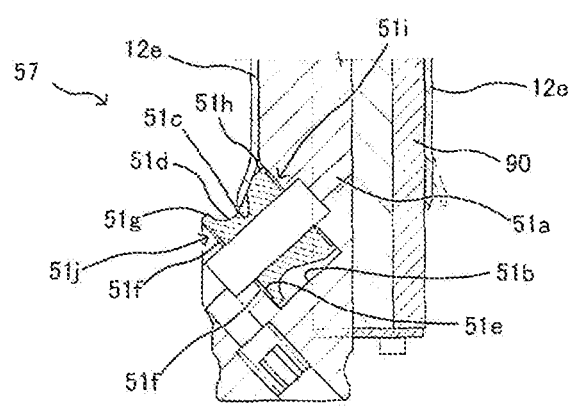

The rounded portion 51d is formed contiguously with the straight flat surface of the tapered portion 51c by curving a portion of the diameter enlarging roller 51 in a semicircular shape so that the diameter enlarging portion 51 is deformed into a Japanese-hand-drum shape. By forming the peripheral surface of the diameter enlarging roller 51 into such a shape, as shown in FIG. 17(a), in the case where the diameter enlarging roller 51 is pulled up while being brought into contact with the inner peripheral surface of the end edge of the metal sleeve 12e, firstly, the metal sleeve 12e is brought into contact with the start end flange portion 51h. As shown in FIG. 17(b), the end edge of the metal sleeve 12e is enlarged in a flat funnel shape along the tapered portion 51c so that the end edge of the metal sleeve 12e can be enlarged in an elastic region of the end of the sleeve pipe with a small diameter enlarging force.

Figure 17C:
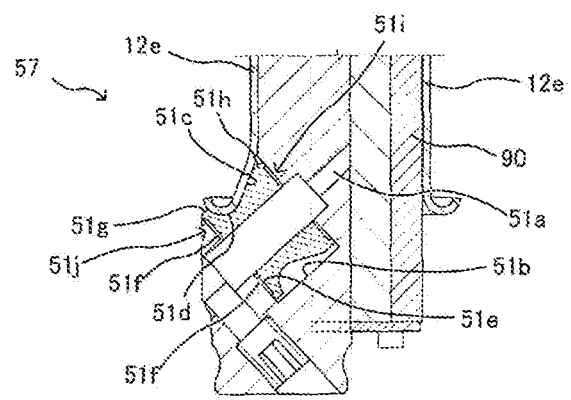

Next, when the diameter enlarging roller 51 is further rotated while being pulled up, as shown in FIG. 17(c), the rounded portion 51d of the peripheral surface plastically deforms the end of the sleeve pipe which is enlarged in a flat shape into a shape similar to a round true semicircular arc. Particularly, the edge of the metal sleeve 12e is elastically deformed into a flat funnel-like tapered shape in a preceding stage and hence, the end edge of the metal sleeve 12e can be easily plastically deformed into a true semicircular arcuate shape having a rounded shape in a succeeding stage. Accordingly, a diameter enlarging force can be reduced so that it is possible to prevent the occurrence of deformation buckling on the distal end or the upper portion of the metal sleeve 12e.

In this manner, when the end edge of the metal sleeve 12e is folded back by the rounded portion 51d of the diameter enlarging roller 51 in the final diameter enlargement, there is no possibility that a load is unnecessarily applied to the roller accommodating chamber 51b or the roller shaft 51a.

Particularly, when a wall thickness of the water pipe 11 or a diverting diameter of the water diverting port 15 is large, a large diameter enlarging force becomes inevitably necessary. With the diameter enlarging roller 51 of the snap tap mounting jig A according to the present invention, the peripheral surface shape of the diameter enlarging roller 51 is formed in two stages by the tapered portion 51c which is a region where the peripheral surface shape of the diameter enlarging roller 51 is elastically deformed, and the rounded portion 51d which is a region where the peripheral surface shape of the diameter enlarging roller 51 is plastically deformed. Accordingly, this embodiment can acquire an advantageous effect that a fold-back diameter enlarging operation can be performed without applying a large load to the above-mentioned peripheral members.

Further, by adjusting and holding the above-mentioned angle α within a range of from 65 degrees to 77 degrees, desired folding back, particularly, bending in a true semicircular arcuate shape can be performed with a small diameter enlarging force. That is, in the tapered portion 51c, by applying an elastic deformation stress which does not reach a yield stress but is as close as possible to the yield stress to the metal sleeve 12e, the metal sleeve 12e can be deformed as largely as possible in an elastic deformation region. On the other hand, since the stress exceeds a yield point in the rounded portion 51d, a stress in the tapered portion 51c which is still short for achieving the stress necessary for achieving the stress in the rounded portion 51d is added as a plastic deformation stress so that a reliable caulking operation can be performed while suppressing seizure and extreme wear. When the above-mentioned elastic deformation stress is excessively smaller than a yield stress, for example, when the angle α exceeds 77 degrees, an inclination angle of the roller shaft 51a with respect to an axis X on an acute angle side becomes small, that is, the diameter enlarging roller 51 becomes too close to the perpendicular. Accordingly, a stress applied to a terminal end flange portion 51g of the diameter enlarging roller 51 is increased thus giving rise to an undesirable situation where buckling is likely to easily occur. On the other hand, when the above-mentioned elastic deformation stress is larger than a yield stress, for example, when the angle α is below 65 degrees, an inclination angle α of the roller shaft 51a with respect to the axis X on an acute angle side is increased, that is, the diameter enlarging roller 51 becomes excessively close to the horizontal so that the plastic deformation is already performed at the tapered portion 51c. Accordingly, when the diameter enlarging operation is finished, an undesirable situation arises where a deformed connection portion which expands obliquely is formed between a trunk portion of the metal sleeve 12e extending in a vertical direction and a true semicircular arc caulked portion formed on a distal end of the trunk portion.

Further, a diameter enlarging stress at the tapered portion 51c pushes the diameter enlarging roller 51 in a direction toward the start end flange portion 51h, and the rounded portion 51d pushes the diameter enlarging roller 51 in a direction toward the terminal end flange portion 51g. That is, the difference between a force toward a terminal end flange portion 51g side in an axial direction of the roller shaft 51a which is generated along with the plastic deformation of the metal sleeve 12e at the rounded portion 51d and a force toward a start end flange portion 51h side in the axial direction of the roller shaft 51a which is generated along with the elastic deformation of the metal sleeve 12e at the tapered portion 51c becomes a pressure applied to an inner wall of the roller accommodating chamber 51b. Accordingly, by adjusting the inclination of the diameter enlarging roller 51 to an angle α which falls within a range of from 65 degrees to 77 degrees, the diameter enlarging roller 51 can sufficiently perform a plastic deformation function without imparting a large deformation force to the diameter enlarging roller 51. Particularly, by reducing a frictional force generated between a lower end surface 51j and the roller accommodating chamber 51b as much as possible, it is possible to avoid the extreme wear.

In this manner, with the maximum use of an elastic force of the end edge of the metal sleeve 12e by the tapered portion 51c, it is possible to form round folding back having a true semicircular arcuate shape by the rounded portion 51d without increasing a bending force of the eccentrically movable shaft 52 and the eccentrically movable bearing 53 (main shaft).

Further, a recessed groove portion 51e is formed on an upper end surface 51i (start end surface) and a lower end surface 51j (terminal end surface) of the obliquely mounted diameter enlarging roller 51, and a shim 51f is fitted into the respective recessed groove portions 51e. That is, the diameter enlarging roller 51 is accommodated in the roller accommodating chamber 51b of the diameter enlarging head 57 in a loosely fitted state, and upper and lower end surfaces 51i, 51j of the obliquely mounted diameter enlarging roller 51 are brought into close contact with a peripheral wall surface of the roller accommodating chamber 51b which is obliquely formed. Accordingly, the shims 51f are interposed between the upper and lower end surfaces 51i, 51j of the obliquely mounted diameter enlarging roller 51 and the accommodating surface of the roller accommodating chamber 51b so as to ensure the smooth rotation of the diameter enlarging roller 51. The shims 51f are accurately fitted into the recessed groove portions 51e and hence, undesired removal or the non-uniform wear of the shims 51f can be prevented.

[10. Enlarged Diameter Amount Detection Mechanism]

The snap tap mounting jig A according to the present invention also includes an enlarged diameter amount detection mechanism 28 for detecting an enlarged diameter amount of the distal end of the metal sleeve 12e brought about by the diameter enlarging roller 51. The enlarged diameter amount detection mechanism 28 is configured to indicate an elevation amount and a rotation amount of the eccentrically movable shaft 52 as an enlarged diameter amount using a scale marked on an enlarged diameter amount detection nut 55 shown in FIG. 19.

Figure 18A:
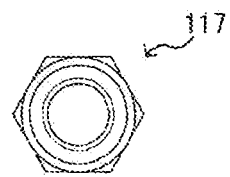
FIG. 18(a) and FIG. 18(b) are explanatory views showing the configuration of a pull-up nut.
Figure 18B:
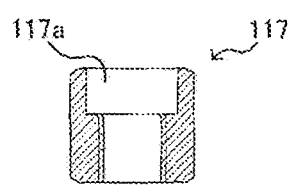
Figure 19A:
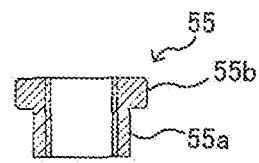
FIG. 19(a) and FIG. 19(b) are explanatory views showing the configuration of an enlarged diameter amount detection nut.
Figure 19B:
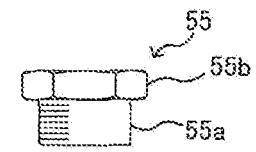
Figure 20A:
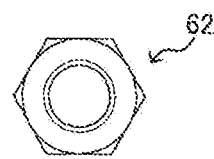
FIG. 20(a) and FIG. 20(b) are explanatory views showing the configuration of a fixing nut.
Figure 20B:
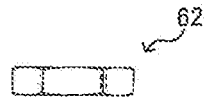

As shown in FIG. 9, the enlarged diameter amount detection mechanism 28 is formed of: the pull-up nut 117 (see FIG. 18(a) and FIG. 18(b)) which is disposed in an overlapping manner on an upper surface of the washer 61 and has an upper-end recessed portion 117a; the enlarged diameter amount detection nut 55 which is formed of a lower cylindrical portion 55a having an outer diameter which allows the insertion of the lower cylindrical portion 55a in the upper-end recessed portion 117a of the pull-up nut 117 as shown in FIG. 19(a) and FIG. 19(b) and marking a scale on a peripheral surface thereof and a nut flange 55b which is formed on an upper end of the lower cylindrical portion 55a, female threads being formed on an inner peripheral surface of the enlarged diameter amount detection nut 55; and a fixing nut 62 which is disposed in an overlapping manner on an upper surface of the nut flange 55b of the enlarged diameter amount detection nut 55 as shown in FIG. 20(a) and FIG. 20(b) and is threadedly engaged with the eccentrically movable shaft 52.

In performing a caulking operation of the distal end of the metal sleeve 12e, when the pull-up nut 117 which is threadedly engaged with the eccentrically movable shaft 52 for pulling up the eccentrically movable shaft 52 is rotated, although the pull-up nut 117 attempts to move downward, the pull-up nut 117 is brought into contact with the washer 61 which forms the integral locking mechanism 27 and hence, the position of the pull-up nut 117 is not changed so that only the eccentrically movable shaft 52 moves upward.

The enlarged diameter amount detection nut 55 is fixed to the eccentrically movable shaft 52 by the fixing nut 62. Accordingly, when the eccentrically movable shaft 52 is pulled up, the scale marked on the lower cylindrical portion 55a of the enlarged diameter amount detection nut 55 is gradually exposed from the upper-end recessed portion 117a of the pull-up nut 117.

An exposure amount of the scale indicates a pull-up amount of the eccentrically movable shaft 52, that is, a fold-back amount and an enlarged diameter amount of the sleeve and hence, a fold-back state of the metal sleeve 12e can be checked by detecting an enlarged diameter amount of the sleeve in the diameter enlarging device body 3 whose inside is not viewable in a see-through manner whereby a mounting state and a sealing state of the snap tap 12 can be checked.

[11. Modification of Diameter Enlarging Roller]

Figure 21:
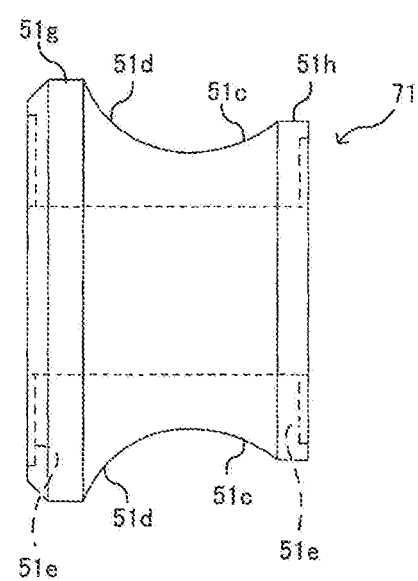
FIG. 21 is an explanatory view showing a modification of a diameter enlarging roller.

FIG. 21 shows a modification of a diameter enlarging roller which can be used in place of the previously-mentioned diameter enlarging roller 51. In this modification, constitutional elements substantially equal to the above-mentioned constitutional elements are given the same symbols, and the description of these constitutional elements is omitted.

As shown in FIG. 21, a diameter enlarging roller 71 has substantially the same configuration as the previously-mentioned diameter enlarging roller 51. However, the diameter enlarging roller 71 differs from the above-mentioned diameter enlarging roller 51 with respect to a point that a tapered portion 51c is shorter than the tapered portion 51c of the diameter enlarging roller 51, and a diameter of a start end flange portion 51h is smaller than a diameter of a terminal end flange portion 51g.

Also with the use of the diameter enlarging roller 71 having such a configuration, an area of the tapered portion 51c can be made small so that a diameter enlarging caulking operation can be performed while reducing a sliding friction generated between the tapered portion 51c and a sleeve inner peripheral surface.

[12. Friction Portion]

A friction portion may be formed on the diameter enlarging roller for performing a diameter enlarging operation of the sleeve more efficiently although the friction portion is not indispensable for the snap tap mounting jig A according to the embodiment.

As has been described above, a diameter enlarging operation of the sleeve is performed as follows. The diameter enlarging head 57 is exposed to the outside of the sleeve by rotating the eccentrically movable shaft 52, the sleeve is brought into contact with the diameter enlarging roller by pulling up the eccentrically movable shaft 52, and a caulking operation is performed while making the diameter enlarging roller roll by the sleeve end portion in a state where the diameter enlarging handle 11 is rotated in a state where the sleeve is deformed. However, when a pulling up force applied to the eccentrically movable shaft 52 is large so that a large force acts on the diameter enlarging roller due to a reaction from the sleeve, there arises a possibility that the diameter enlarging roller is strongly pressed to the roller shaft 51a and the wall surface of the roller accommodating chamber 51b so that the diameter enlarging roller cannot be rotated in rare cases, and there may be a case where slippage occurs between the sleeve and the diameter enlarging roller.

In such a state, seizure occurs between the diameter enlarging roller and a diameter enlarging surface of the sleeve. Accordingly, a rotational resistance of the diameter enlarging handle 118 is increased and, further, there is a possibility that metal powder is peeled off from a portion where seizure occurs and metal powder is mixed into water flowing through the water pipe when a snap tap mounting operation is performed without suspending the supply of water.

As a result of intensive studies made by the inventors of the present invention in view of such circumstances, the inventors have found that it is possible to overcome the above-mentioned problems by forming the friction portion on the diameter enlarging roller.

Figure 22A:
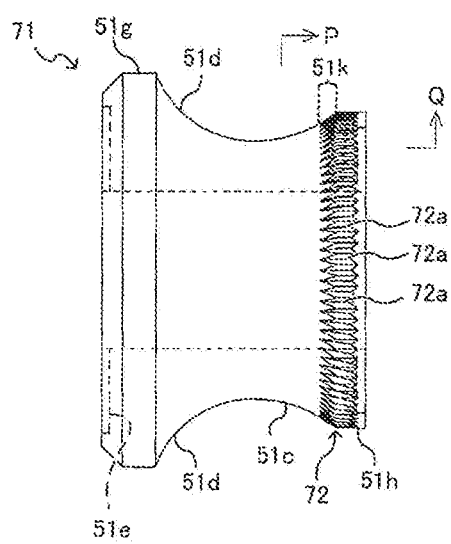
FIG. 22(a) and FIG. 22(b) are explanatory views showing the configuration of a diameter enlarging roller having a friction portion.
Figure 22B:
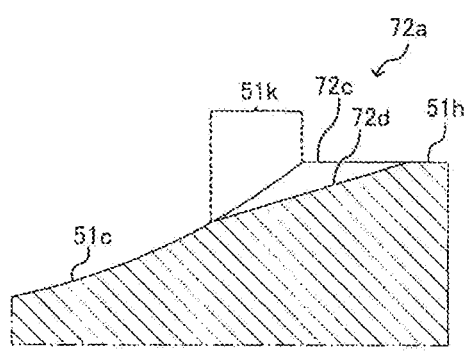

FIG. 22(a) is an explanatory view showing a diameter enlarging roller 73 on which a friction portion 72 is formed by employing the diameter enlarging roller 71 shown in FIG. 21 as a base, and FIG. 22(b) is an enlarged cross-sectional view of portions indicated by symbols P and Q in FIG. 22(a).

Although the diameter enlarging roller 73 has substantially the same configuration as the diameter enlarging roller 71, the diameter enlarging roller 73 differs in structure from the diameter enlarging roller 71 with respect to a point that the friction portion 72 is formed on a start end flange portion 51h which is positioned on an upper end side of a recessed portion formed of a tapered portion 51c and a rounded portion 51d.

To be more specific, the friction portion 72 of the diameter enlarging roller 73 is formed ranging from the start end flange portion 51h to an upper region 51k disposed in the vicinity of a start end flange portion 51h side of the tapered portion 51c. Further, it is not always necessary to form the friction portion 72 as shown in FIG. 22(a). That is, it is sufficient that the friction portion 72 is formed at least on the start end flange portion 51h where the sleeve is brought into contact with the diameter enlarging roller first at the time of expanding the sleeve. Further, the friction portion 72 may be formed up to the tapered portion 51c and the rounded portion 51d including the start end flange portion 51h.

As shown in FIG. 22(a), the friction portion 72 is formed by forming a plurality of grooves 72a as friction structural members on a circumference of the diameter enlarging roller 73 (start end flange portion 51h) at predetermined intervals.

Accordingly, at the time of enlarging a diameter of the sleeve, while surely allowing the rotational following of the diameter enlarging roller in a direction toward a sleeve inner peripheral surface by generating a frictional force mainly in the circumferential direction of the diameter enlarging roller 73 between the diameter enlarging roller 73 and the sleeve, the slide resistance of the diameter enlarging roller against the sleeve along the tapered portion 51c and the rounded portion 51d (recessed portion) from the start end flange portion 51h can be suppressed as much as possible. Accordingly, a load applied to the diameter enlarging roller and a load applied to the members around the diameter enlarging roller brought about by the formation of the friction portion 72 can be reduced.

As shown in FIG. 22(b), by forming such grooves 72a on the friction portion 72, the friction portion 72 has the crest and valley structure formed of crest portions 72c and valley portions 72d where the crest portion 72c and the valley portion 72d are alternately and repeatedly formed, wherein the difference between the crest portion 72c and the valley portion 72d, that is, a groove depth is gradually decreased from the start end flange portion 51h to the tapered portion 51c.

Accordingly, a load applied to the diameter enlarging roller and a load applied to the members around the diameter enlarging roller which are generated along with the formation of the friction portion can be reduced, and marks formed on the expanded portion of the sleeve attributed to the contact with the friction portion can be reduced.

Figure 23:
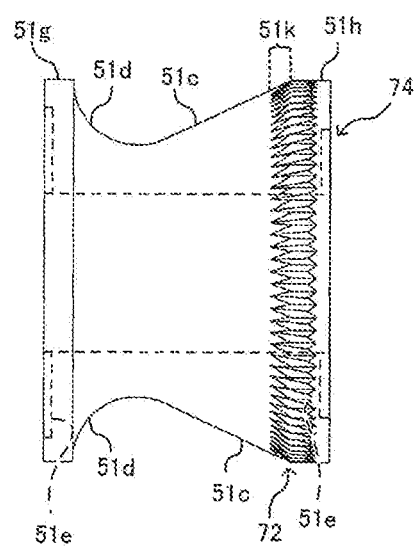
FIG. 23 is an explanatory view showing the configuration of a diameter enlarging roller having a friction portion.

In this embodiment, the description has been made with respect to the example where the friction portion 72 is formed by employing the diameter enlarging roller 71 as a base. However, it is needless to say that the diameter enlarging roller 74 may be formed by forming the friction portion 72 by employing the diameter enlarging roller 51 as a base as shown in FIG. 23. Further, it is not always necessary that the recessed portion of the diameter enlarging roller includes both the tapered portion 51c and the rounded portion 51d. Provided that the recessed portion has a surface which can form an end of the sleeve into a folded-back shape, substantially the same advantageous effects can be acquired due to the formation of the friction portion 72. That is, the present invention also provides a snap tap mounting jig which includes a diameter enlarging roller having a friction portion where diameter enlarging roller includes neither the tapered portion 51c nor the rounded portion 51d although the diameter enlarging roller has a surface which can form an end of a sleeve into a folded-back shape.

[13. Modification of Diameter Enlarging Roller Provided with Friction Portion]

Figure 24A:
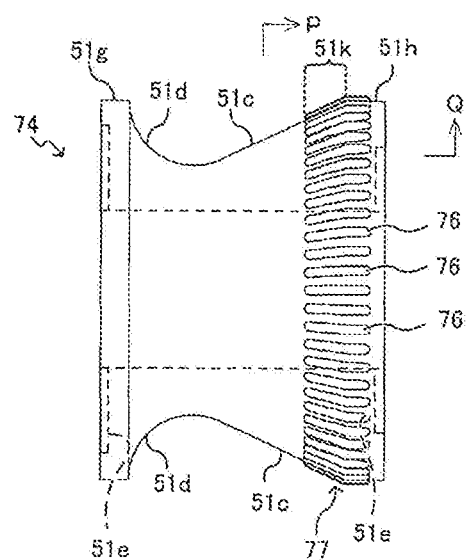
FIG. 24(a) and FIG. 24(b) are explanatory views showing the configuration of a diameter enlarging roller having a friction portion.
Figure 24B:
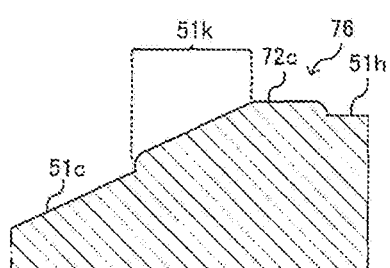

FIG. 24(a) and FIG. 24(b) show a further modification of the diameter enlarging roller provided with a friction portion. FIG. 24(a) is an explanatory view showing a configuration of a diameter enlarging roller 75, and FIG. 24(b) is an enlarged cross-sectional view of a portion of the diameter enlarging roller 75 indicated by symbol P and a portion of the diameter enlarging roller 75 indicated by Q in FIG. 24(a).

The diameter enlarging roller 75 has substantially the same configuration as the diameter enlarging roller 74. However, the diameter enlarging roller 75 differs in structure from the diameter enlarging roller 74 with respect to a point that a friction structural member which forms a friction portion 77 is constituted of a plurality of projecting ridge members 76 which are formed in an extending manner from a start end flange portion 51h along an upper region 51k.

Also in this modification, in the same manner as the friction structural members 74, the plurality of projecting ridge members 76 are formed on a circumference of the diameter enlarging roller 75 (start end flange portion 51h) at predetermined intervals. Due to the formation of the projecting ridge members 76, at the time of enlarging a diameter of the sleeve, while surely allowing the rotational following of the diameter enlarging roller 75 in a direction toward a sleeve inner peripheral surface while generating a frictional force mainly in a circumferential direction of the diameter enlarging roller 75 between the diameter enlarging roller 75 and a sleeve, the slide resistance of the sleeve along the tapered portion 51c and the rounded portion 51d (recessed portion) from the start end flange portion 51h can be suppressed as much as possible. Accordingly, a load applied to the diameter enlarging roller and a load applied to the peripheral member of the diameter enlarging roller brought about by the formation of the friction portion 72 can be reduced.

By forming such projecting ridge members 76 on the friction portion 77, the friction portion 77 has the crest and valley structure made by the repetition of crest portions 72c which are peak portions of the projecting ridge members 76 and valley portions 72d which are formed between the projecting ridge members 76.

Peaks of the crest portions 72c of the friction portion 77 are rounded, and are formed into obtuse peaks and hence, marks formed on the sleeve which is brought into contact with the friction portion 77 due to contacting of the sleeve with the friction portion 77 can be reduced as much as possible.

Also in the snap tap mounting jig A provided with the diameter enlarging roller 75 having such a configuration, a rotational force of the diameter enlarging handle can be efficiently transmitted to the diameter enlarging roller and hence, a force in a pull-up direction applied to the diameter enlarging roller can be decreased whereby lifetimes of members around the diameter enlarging roller can be prolonged by decreasing wear on these members. Particularly, when the diameter enlarging roller cannot be rotated due to seizure, the diameter enlargement cannot be performed unless a large force is applied to the diameter enlarging handle. However, seizure of the diameter enlarging roller can be eliminated and hence, it is possible to reduce a force applied to the diameter enlarging handle.

REFERENCE SIGNS LIST

11: water pipe
12: snap tap
12a: water passing sleeve
12e: metal sleeve
12f: distal end opening portion
13: cap nut
14: drilling machine
15: water diverting port
16: rubber packing
51: diameter enlarging roller
51c: tapered portion
51d: round portion
51e: recessed groove portion
51f: shim
52: eccentrically movable shaft
53: eccentrically movable bearing
54: sleeve pushing pipe
55: enlarged diameter amount detection nut
57: diameter enlarging head
58: diameter enlarging operating shaft
11: main shaft
A: snap tap mounting jig

The invention claimed is:

1. A snap tap mounting jig, comprising:
a main shaft including a distal end, the main shaft being insertable into a metal sleeve;
a rubber packing that is disposed in a water diverting port formed in a water pipe on the distal end of the main shaft;
an opening distal end portion of the metal sleeve loosely fitted on an inner peripheral surface of the rubber packing, the opening distal end portion of the metal sleeve being configured to be insertable and projectable into an inside of the water pipe;
an eccentrically movable shaft that is insertable into the main shaft in a longitudinal direction;
a diameter enlarging roller coupled to a lower end of the eccentrically movable shaft obliquely by way of a diameter enlarging head, the diameter enlarging roller being configured to advance or retract toward an inside or an outside of an outer diameter of the main shaft due to an eccentric rotation of the eccentrically movable shaft; and
a snap tap that is configured to be caulked to the water diverting port of the water pipe;
wherein the opening distal end portion of the metal sleeve is bendable toward the outside of the outer diameter of the main shaft in a folded-back state together with the rubber packing due to a rotation of the main shaft while the diameter enlarging roller is in contact with the opening distal end portion of the metal sleeve projecting into the inside of the water pipe in a state where the diameter enlarging roller is advanced to the outside of the outer diameter of the main shaft;
wherein the diameter enlarging roller has a hyperboloid shape having a recessed portion and a substantially upper half portion of the diameter enlarging roller mounted obliquely has a substantially tapered shape and a substantially lower half portion of the diameter enlarging roller mounted obliquely has a rounded shape; and
wherein the diameter enlarging roller has a start end flange portion with which a distal end of the metal sleeve is configured to be brought into contact when enlarging of a diameter of the metal sleeve on an upper end side of the recessed portion and a friction portion is disposed on the start end flange portion.

2. The snap tap mounting jig according to claim 1, wherein an inclination angle of the tapered portion of the diameter enlarging roller mounted obliquely falls within a range of an angle of depression from 65 degrees to 77 degrees with respect to an imaginary straight line orthogonal to an axis of the eccentric movable shaft.

3. The snap tap mounting jig according to claim 1, wherein the friction portion is formed by forming friction structural members which generate a frictional force on a circumference of the start end flange portion at predetermined intervals.

4. The snap tap mounting jig according to claim 3, wherein the friction structural members are formed ranging from the start end flange portion to an upper region of the tapered portion, and a groove depth of a crest and valley structure of the friction portion formed of the friction structural members that gradually decreases from the start end flange portion to the tapered portion.

5. The snap tap mounting jig according to claim 4, wherein the crest portions of the crest and valley structure include one or more peaks and the peaks of crest portions of the crest and valley structure are obtuse peaks.

6. The snap tap mounting jig according to claim 1, wherein a recessed groove portion is disposed on an upper end surface and a lower end surface of the diameter enlarging roller and a shim is disposed in the recessed groove portion.

7. The snap tap mounting jig according to claim 1, wherein:
the snap tap mounting jig is configured to detect an enlarged diameter amount of a distal end of the metal sleeve by the diameter enlarging roller, the snap tap mounting jig comprising:
an enlarged diameter amount detection mechanism on a proximal end operating portion of a roller shaft having a distal end on which the diameter enlarging roller is continuously formed, the enlarged diameter amount detection mechanism being configured to indicate an elevation and a rotational amount of the roller shaft as the enlarged diameter amount by means of a scale marked on an enlarged diameter amount detection nut integrally formed with the roller shaft.

8. A snap tap mounting jig, comprising:
a main shaft including a distal end, the main shaft being insertable into a metal sleeve;
a rubber packing that is disposed in a water diverting port formed in a water pipe on the distal end of the main shaft;
an opening distal end portion of a metal sleeve loosely fitted on an inner peripheral surface of the rubber packing, the opening distal end portion of the metal sleeve being configured to be insertable and projectable into the inside of the water pipe;
an eccentrically movable shaft that is insertable into the main shaft in a longitudinal direction;
a diameter enlarging roller coupled to on a lower end of the eccentrically movable shaft obliquely by way of a diameter enlarging head, the diameter enlarging roller being configured to advance or retract toward an inside or an outside of an outer diameter of the main shaft due to an eccentric rotation of the eccentrically movable shaft; and
a snap tap that is configured to be caulked to the water diverting port of the water pipe;
wherein the opening distal end portion of the metal sleeve is bendable toward the outside of the outer diameter of the main shaft in a folded-back state together with the rubber packing due to a rotation of the main shaft while bringing the diameter enlarging roller is in contact with the opening distal end portion of the metal sleeve projecting into the inside of the water pipe in a state where the diameter enlarging roller is advanced to the outside of the outer diameter of the main shaft;
wherein the diameter enlarging roller has a hyperboloid shape having a recessed portion and a substantially upper half portion of the diameter enlarging roller mounted obliquely has a substantially tapered shape, and a substantially lower half portion of the diameter enlarging roller mounted obliquely has a rounded shape; and
wherein a recessed groove portion is disposed on an upper end surface and a lower end surface of the diameter enlarging roller and a shim is disposed in the recessed groove portion.

9. A snap tap mounting jig, comprising:
a main shaft including a distal end, the main shaft being insertable into a metal sleeve;
a rubber packing that is disposed in a water diverting port formed in a water pipe on the distal end of the main shaft;
an opening distal end portion of the metal sleeve loosely fitted on an inner peripheral surface of the rubber packing is configured to be insertable and projectable into an inside of the water pipe;
an eccentrically movable shaft that is insertable into the main shaft in a longitudinal direction
a diameter enlarging roller coupled to a lower end of the eccentrically movable shaft obliquely by way of a diameter enlarging head, the diameter enlarging roller being configured to advance or retract toward an inside or an outside of an outer diameter of the main shaft due to an eccentric rotation of the eccentrically movable shaft; and
a snap tap that is configured to be caulked to the water diverting port of the water pipe;
wherein the opening distal end portion of the metal sleeve is bendable toward the outside of the outer diameter of the main shaft in a folded-back state together with the rubber packing due to a rotation of the main shaft while bringing the diameter enlarging roller is in contact with the opening distal end portion of the metal sleeve projecting into the inside of the water pipe in a state where the diameter enlarging roller is advanced to the outside of the outer diameter of the main shaft;
wherein the diameter enlarging roller has a hyperboloid shape having a recessed portion and a substantially upper half portion of the diameter enlarging roller mounted obliquely has a substantially tapered shape, and a substantially lower half portion of the diameter enlarging roller mounted obliquely is has a rounded shape; and
wherein the snap tap mounting jig is configured to detect an enlarged diameter amount of a distal end of the metal sleeve by the diameter enlarging roller, and further comprises:
an enlarged diameter amount detection mechanism on a proximal end operating portion of a roller shaft having a distal end on which the diameter enlarging roller is configured to be continuously formed and the enlarged diameter amount detection mechanism is configured to indicate an elevation and a rotational amount of the roller shaft as the enlarged diameter amount by means of a scale marked on an enlarged diameter amount detection nut that is integrally formed with the roller shaft.

* * * * *